United States Patent
Bickham et al.

(10) Patent No.: US 12,105,322 B2
(45) Date of Patent: Oct. 1, 2024

(54) REDUCED DIAMETER OPTICAL FIBER WITH IMPROVED MICROBENDING

(71) Applicant: CORNING INCORPORATED, Corning, NY (US)

(72) Inventors: Scott Robertson Bickham, Corning, NY (US); Sergejs Makovejs, Manchester (GB); Pushkar Tandon, Painted Post, NY (US); Aramais Robert Zakharian, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/379,476

(22) Filed: Oct. 12, 2023

(65) Prior Publication Data

US 2024/0045138 A1    Feb. 8, 2024

Related U.S. Application Data

(62) Division of application No. 17/184,909, filed on Feb. 25, 2021, now Pat. No. 11,874,494.

(60) Provisional application No. 62/991,231, filed on Mar. 18, 2020.

(30) Foreign Application Priority Data

Apr. 3, 2020   (NL) .................................... 2025269

(51) Int. Cl.
*G02B 6/036*   (2006.01)
*G02B 6/02*    (2006.01)

(52) U.S. Cl.
CPC ......... *G02B 6/036* (2013.01); *G02B 6/02009* (2013.01); *G02B 6/02295* (2013.01)

(58) Field of Classification Search
CPC .......................... G02B 6/036; G02B 6/02009; G02B 6/02295; G02B 6/02014; G02B 6/02038; G02B 6/0365; G02B 6/02395
See application file for complete search history.

(56) References Cited

U.S. PATENT DOCUMENTS

| 7,272,289 B2 | 9/2007 | Bickham et al. |
| 8,145,027 B2 | 3/2012 | Overton et al. |
| 8,467,649 B2 | 6/2013 | Bickham et al. |

(Continued)

OTHER PUBLICATIONS

Achten et al., "Compact Multi-Fibre Bundle for high capacity multimode fiber transmission", In 63rd Proceedings of IWCS, pp. 345-348.

(Continued)

*Primary Examiner* — Andrew Jordan
(74) *Attorney, Agent, or Firm* — Amy T. Lang

(57) ABSTRACT

An optical fiber is provided that includes a core region and a cladding region. The core region is formed of silica glass doped with chlorine and/or an alkali metal. The cladding region surrounds the core region and includes an inner cladding directly adjacent to the core region, an outer cladding surrounding the inner cladding, and a trench region disposed between the inner cladding and the outer cladding in a radial direction. The trench region has a volume of about 30% Δ-micron$^2$ or greater. Additionally, the optical fiber has an effective area at 1550 nm of about 100 micron$^2$ or less.

20 Claims, 13 Drawing Sheets

(56) References Cited

U.S. PATENT DOCUMENTS

| | | | |
|---|---|---|---|
| 8,600,206 B2 | 12/2013 | Overton | |
| 8,731,357 B2 | 5/2014 | Hirano et al. | |
| 9,057,817 B2* | 6/2015 | Bookbinder | G02B 6/02009 |
| 9,804,326 B2 | 10/2017 | Bickham et al. | |
| 9,995,874 B2* | 6/2018 | Bookbinder | G02B 6/03627 |
| 10,162,109 B2* | 12/2018 | Bennett | G02B 6/03694 |
| 11,009,655 B2* | 5/2021 | Bookbinder | C08F 222/1025 |
| 11,009,656 B2* | 5/2021 | Bookbinder | G02B 6/0283 |
| 11,150,403 B2* | 10/2021 | Bookbinder | G02B 6/02395 |
| 11,187,853 B2* | 11/2021 | Bennett | G02B 6/0288 |
| 11,194,107 B2* | 12/2021 | Bennett | G02B 6/02004 |
| 11,579,359 B2* | 2/2023 | Bennett | C03C 13/045 |
| 11,656,403 B2* | 5/2023 | Bennett | G02B 6/02395 |
| | | | 385/124 |
| 11,733,453 B2* | 8/2023 | Bennett | C08G 18/3221 |
| | | | 385/126 |
| 11,782,207 B2* | 10/2023 | Bickham | G02B 6/02014 |
| | | | 385/128 |
| 11,828,980 B2* | 11/2023 | Bennett | G02B 6/02019 |
| 11,874,494 B2* | 1/2024 | Bickham | G02B 6/02014 |
| 2007/0003198 A1 | 1/2007 | Gibson et al. | |
| 2008/0279515 A1 | 11/2008 | Bickham et al. | |
| 2009/0232463 A1 | 9/2009 | Gibson et al. | |
| 2011/0129191 A1 | 6/2011 | Bickham et al. | |
| 2012/0033924 A1 | 2/2012 | Gibson et al. | |
| 2012/0093471 A1 | 4/2012 | Gibson et al. | |
| 2012/0106909 A1 | 5/2012 | Bickham et al. | |
| 2013/0077925 A1 | 3/2013 | Hirano et al. | |
| 2014/0308015 A1* | 10/2014 | Bookbinder | G02B 6/03627 |
| | | | 385/124 |
| 2016/0216442 A1* | 7/2016 | Bookbinder | G02B 6/028 |
| 2018/0031760 A1* | 2/2018 | Bickham | G02B 6/4246 |
| 2018/0031761 A1 | 2/2018 | Bookbinder et al. | |
| 2018/0128971 A1* | 5/2018 | Bookbinder | C08F 222/1025 |
| 2018/0203184 A1* | 7/2018 | Bookbinder | G02B 6/02009 |
| 2018/0224599 A1* | 8/2018 | Bennett | G02B 6/03627 |
| 2019/0331849 A1* | 10/2019 | Bennett | G02B 6/0288 |
| 2020/0024176 A1 | 1/2020 | Peckham et al. | |
| 2020/0284976 A1* | 9/2020 | Bookbinder | G02B 6/0365 |
| 2021/0055490 A1* | 2/2021 | Bennett | G02B 6/368 |
| 2021/0294027 A1 | 9/2021 | Bennett et al. | |
| 2021/0294029 A1 | 9/2021 | Bickham et al. | |
| 2021/0356655 A1* | 11/2021 | Bennett | G02B 6/0281 |
| 2021/0356659 A1* | 11/2021 | Bennett | C08G 18/3221 |
| 2021/0356661 A1* | 11/2021 | Bennett | G02B 6/12002 |
| 2022/0026627 A1* | 1/2022 | Bickham | G02B 6/02014 |
| 2022/0043201 A1 | 2/2022 | Bickham et al. | |
| 2022/0283363 A1 | 9/2022 | Logunov et al. | |
| 2023/0393328 A1* | 12/2023 | Bickham | G02B 6/0365 |
| 2024/0045138 A1* | 2/2024 | Bickham | G02B 6/036 |

OTHER PUBLICATIONS

Bickham et al., "Multimode fiber for high-density optical interconnects", In Proceedings of SPIE 10109, Optical Interconnects XVII, 2017, 9 pages.

Bickham et al., "Reduced diameter fibers for high-density optical interconnects", In Proceedings of SPIE Optical Interconnects, vol. XVIII, 2018, 7 pages.

Clark et al., "Quantifying the Puncture Resistance of Optical Fiber Coatings", In the Proceedings of the 52nd International Wire & Cable Symposium, 2003, pp. 237-245.

Dar et al., "Submarine Cable Cost Reduction Through Massive SDM", European Conference on Optical Communication, 2017, 3 pages.

Desbruslais, "Maximizing the Capacity of Ultra-Long Haul Submarine Systems", 20th European Conference on Networks and Optical Communications, 2015, 7 pages.

Dutch Patent Application No. 2025269; Search Report and Written Opinion dated Nov. 20, 2020; 12 Pages; Dutch Patent Office.

European Patent Application No. 21162261.8, European Search Report dated Aug. 12, 2021 3 pages; European Patent Office.

Fevrier et al., "Facebook Perspective on Submarine Wet Plant Evolution", Optical Fiber Communication Conference (OFC), 2019, 3 pages.

International Search Report and Written Opinion of the International Searching Authority; PCT/US2021/020211 Mailed on Jul. 5, 2021, 16 pages; European Patent Office.

Isaji et al., "Multi-Mode Fiber Ribbon Compatible with Standard Ribbon for High-Density Optical Interconnection", In Proceedings of 56th IWCS, 2007, pp. 149-153.

Iwaya et al., "Development of Optical Wiring Technology for Optical Interconnects", In Furukawa Review No. 41, Feb. 2012, 5 pages.

Pecci et al., "SDM: a Revolution for the Submarine Industry", Submarine Telecom Magazine, May 2019, 6 pages.

Pecci et al., "Will SDM Truly Revolutionize the Submarine Communication Industry?", Available at : https://www.ofcconference.org/en-us/home/program-speakers/panel/sdm-truly-revolutionize, 1 page.

Sinkin et al., "SDM Concepts for Submarine Transmission", In Photonic Networks and Devices Conference, 2017, 2 pages.

* cited by examiner

REDUCED DIAMETER OPTICAL FIBER WITH IMPROVED MICROBENDING

This Application is a divisional of U.S. patent application Ser. No. 17/184,909 filed on Feb. 25, 2021, which claims the benefit of priority to Dutch Patent Application No. 2025269 filed on Apr. 3, 2020, which claims priority from U.S. Provisional Patent Application Ser. No. 62/991,231 filed on Mar. 18, 2020, the contents of which are relied upon and incorporated herein by reference in their entirety.

FIELD OF THE DISCLOSURE

This disclosure pertains to optical fibers. More particularly, this disclosure pertains to optical fiber cables configured for submarine environments. Most particularly, this disclosure pertains to optical fibers having reduced diameters without a significant increase in microbending sensitivity.

BACKGROUND OF THE DISCLOSURE

Submarine cables are designed to carry telecommunication signals across stretches of land ocean and sea. Over the past several years, there has been a dramatic increase in telecommunications signals over submarine cables, with greater than ninety percent of inter-continental communication signals currently being transmitted over these cables. Thus, the demand for the transmission capacity of such submarine cables has increased, driven by the growth of internet traffic among different continents.

Traditional approaches to increase the transmission capacity of submarine cables include wavelength division multiplexing, to increase the number of transmission channels, and advanced modulation formats, to increase the data rate per channel. However, the number of channels and channel data rate are nearly at the practical limits, thus rendering these approaches no longer practical. Another possible approach to increase the transmission capacity of submarine cables is to increase the number of fibers within the cables by increasing the overall diameter of the cables. However, this approach is also not practical as the diameter of submarine cables is limited in order to provide easy deployment of the cables. Increasing the diameter of the submarine cable makes the cables harder to manage due to the increased weight and the limited storage capacity on the ships that deploy undersea optical cables.

SUMMARY

The present disclosure provides optical fibers having reduced diameters to increase the fiber count in submarine cables, thus allowing the diameter of the submarine cables to remain at an acceptable size for easy deployment. In particular, the optical fibers disclosed herein have a reduced glass diameter and/or a reduced coating thickness while still maintaining microbending characteristics needed for long-haul transmission. More specifically, the optical fibers disclosed herewith provide low attenuation, low microbending sensitivity, and high puncture resistance in a compact form. The reduced glass diameter and/or reduced coating thickness may be used to increase the fiber density within standard submarine cable designs. The microbending properties of such reduced diameter optical fibers, as disclosed herein, are achieved by co-optimizing the coating properties of the fibers with the dimensions of a depressed cladding layer in the refractive index profile to inhibit the leakage of the optical signal. The higher modulus of the secondary coating improves the puncture resistance and handleability of the fiber, despite the smaller cross-sectional area.

The present description extends to an optical fiber having a core region comprising silica glass doped with chlorine and/or an alkali metal. The optical fiber further includes a cladding region surrounding the core region, the cladding region comprising an inner cladding directly adjacent to the core region, an outer cladding surrounding the inner cladding, and a trench region disposed between the inner cladding and the outer cladding in a radial direction, the trench region having a volume of about 30% $\Delta$-micron$^2$ or greater. Additionally, the optical fiber has an effective area at 1550 nm of about 100 micron$^2$ or less.

The present description further extends to an optical fiber having a core region comprising silica glass doped with chlorine and/or an alkali metal and a cladding region surrounding the core region. The cladding region comprises an inner cladding directly adjacent to the core region, an outer cladding surrounding the inner cladding, and a trench region disposed between the inner cladding and the outer cladding in a radial direction, the trench region having a volume of about 30% $\Delta$-micron$^2$ or greater. The optical fiber further includes a primary coating surrounding the cladding region and a secondary coating surrounding the primary coating. The primary coating having an in situ modulus of about 0.5 MPa or less, and the secondary coating having an in situ modulus of about 1500 MPa or more. A diameter of the secondary coating is about 210 microns or less.

The present description further extends to a multicore optical fiber having a first core comprising silica glass doped with chlorine and/or an alkali metal, a first inner cladding surrounding the first core, and a first outer cladding surrounding the first inner cladding and comprising a first trench region having a volume of about 30% $\Delta$-micron$^2$ or greater. Additionally, the multicore optical fiber has a second core comprising silica glass doped with chlorine and/or an alkali metal, a second inner cladding surrounding the second core, and a second outer cladding surrounding the second inner cladding and comprising a second trench region having a volume of about 30% $\Delta$-micro$^2$ or greater. A common cladding surrounds the first core and the second core. Furthermore, the first core and the second core each have an effective area at 1550 nm of about 100 micron$^2$ or less.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
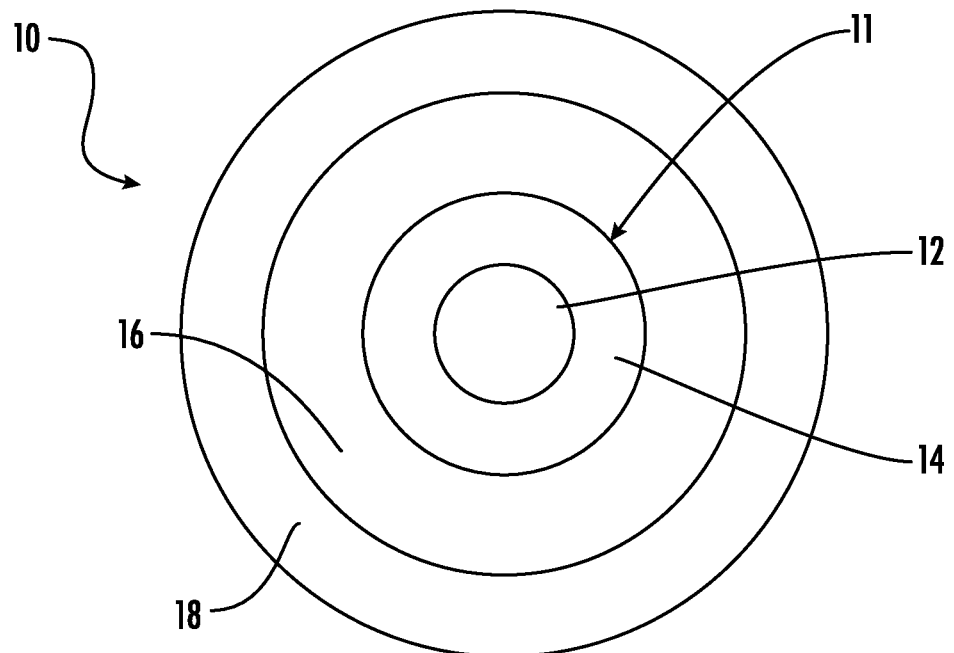
FIG. 1 is a schematic view of a coated optical fiber according to embodiments of the present disclosure.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims which follow, reference will be made to a number of terms which shall be defined to have the following meanings:

"Optical fiber" refers to a waveguide having a glass portion surrounded by a coating. The glass portion includes a core and a cladding and is referred to herein as a "glass fiber".

"Radial position", "radius", or the radial coordinate "r" refers to radial position relative to the centerline (r=0) of the fiber.

"Refractive index" refers to the refractive index at a wavelength of 1550 nm, unless otherwise specified.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. $\Delta$ or $\Delta$ %) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined by Eq. (1) below, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) as:

$$\Delta_i(r_i)\% = 100\frac{\left(n_i^2 - n_{ref}^2\right)}{2n_i^2} \tag{1}$$

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass, which has a value of 1.444 at a wavelength of 1550 nm. As used herein, the relative refractive index is represented by $\Delta$ (or "delta") or $\Delta$ % (or "delta %) and its values are given in units of "%", unless otherwise specified. Relative refractive index may also be expressed as $\Delta(r)$ or $\Delta(r)$ %.

The average relative refractive index ($\Delta_{ave}$) of a region of the fiber is determined from Eq. (2):

$$\Delta_{ave} = \int_{r_{inner}}^{r_{outer}} \frac{\Delta(r)dr}{(r_{outer} - r_{inner})} \tag{2}$$

where $r_{inner}$ is the inner radius of the region, $r_{outer}$ is the outer radius of the region, and $\Delta(r)$ is the relative refractive index of the region.

The refractive index of an optical fiber profile may be measured using commercially available devices, such as the IFA-100 Fiber Index Profiler (Interfiber Analysis LLC, Sharon, MA USA) or the S14 Refractive Index Profiler (Photon Kinetics, Inc., Beaverton, OR USA). These devices measure the refractive index relative to a measurement reference index, $n(r)-n_{meas}$, where the measurement reference index $n_{meas}$ is typically a calibrated index matching oil or pure silica glass. The measurement wavelength may be 632.5 nm, 654 nm, 677.2 nm, 654 nm, 702.3 nm, 729.6 nm, 759.2 nm, 791.3 nm, 826.3 nm, 864.1 nm, 905.2 nm, 949.6 nm, 997.7 nm, 1050 nm, or any wavelength therebetween. The absolute refractive index n(r) is then used to calculate the relative refractive index as defined by Eq. (1).

The term "α-profile" or "alpha profile" refers to a relative refractive index profile Δ(r) that has the functional form defined in Eq. (3):

$$\Delta(r) = \Delta(r_0)\left[1 - \left[\frac{|r - r_0|}{(r_z - r_0)}\right]^\alpha\right] \tag{3}$$

where $r_o$ is the radial position at which Δ(r) is maximum, $\Delta(r_0) > 0$, $r_z > r_0$ is the radial position at which Δ(r) decreases to its minimum value, and r is in the range $r_i \leq r \leq r_f$, where $f_i$ is the initial radial position of the α-profile, $r_f$ is the final radial position of the α-profile, and α is a real number. $\Delta(r_0)$ for an α-profile may be referred to herein as $\Delta_{max}$ or, when referring to a specific region i of the fiber, as $\Delta_{imax}$. When the relative refractive index profile of the fiber core region is described by an α-profile with $r_0$ occurring at the centerline (r=0), $r_z$ corresponding to the outer radius $r_1$ of the core region, and $\Delta_1(r_1)=0$, Eq. (3) simplifies to Eq. (4):

$$\Delta_1(r) = \Delta_{1max}\left[1 - \left[\frac{r}{r_1}\right]^\alpha\right] \tag{4}$$

Figure 5:
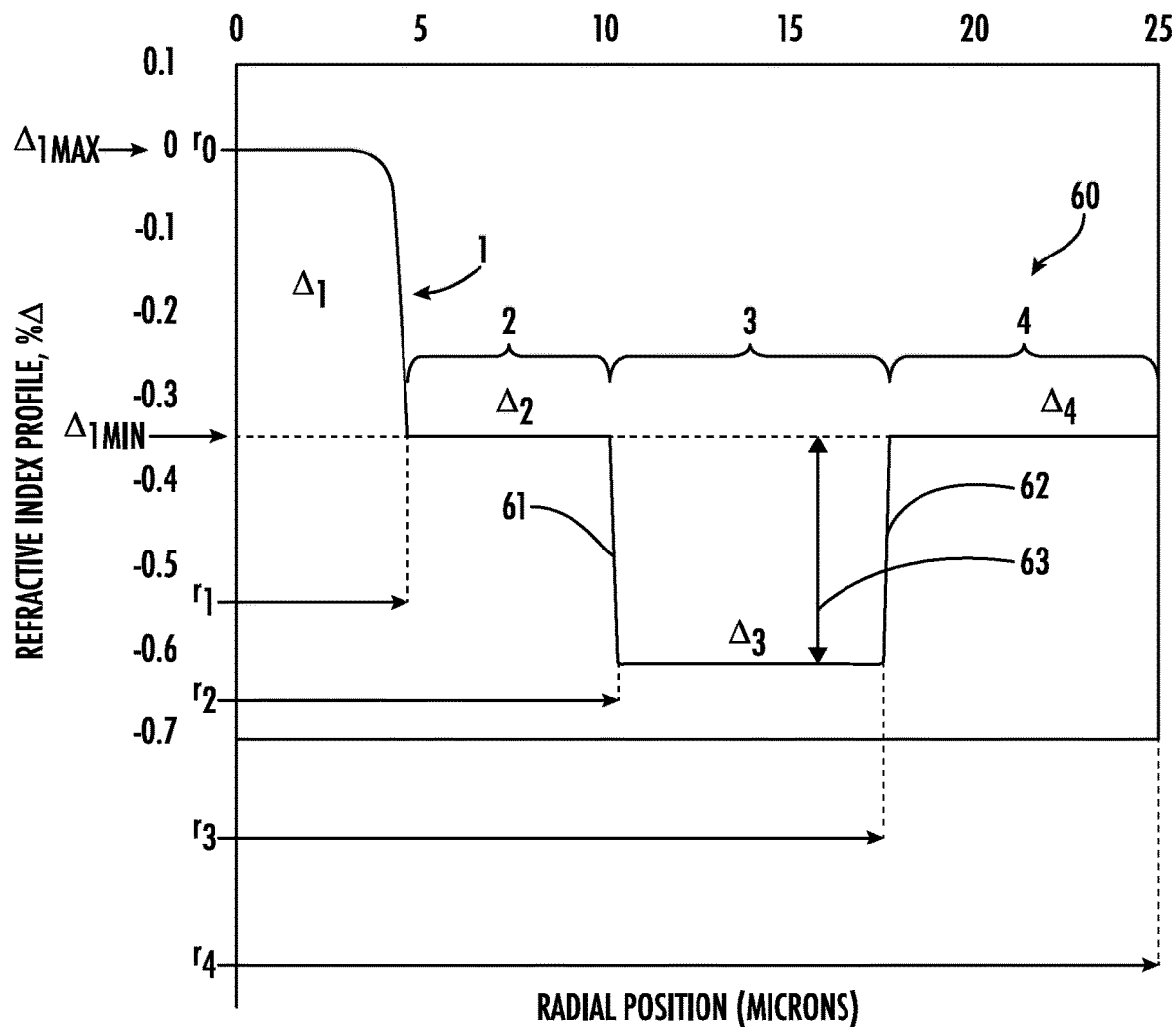
FIG. 5 depicts a relative refractive index profile of an optical fiber according to embodiments of the present disclosure.

When the core region has an index described by Eq. (4), the outer radius $r_1$ can be determined from the measured relative refractive index profile by the following procedure. Estimated values of the maximum relative refractive index $\Delta_{1max}$, α, and outer radius $r_{lest}$ are obtained from inspection of the measured relative refractive index profile and used to create a trial function $\Delta_{trial}$ between $r=-r_{1est}$ and $r=r_{1est}$. Relative refractive index profiles of representative glass fibers having cores described by an α-profile, in accordance with embodiments of the present disclosure, are shown in FIGS. 5 and 6.

"Trench volume" is defined as:

$$V_{Trench} = \left|2\int_{r_{Trench,inner}}^{r_{Trench,outer}} \Delta_{Trench}(r) r dr\right| \tag{5}$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of % Δmicron², % Δ-micron², % Δ-μm², or % Δμm², whereby these units can be used interchangeably herein. A trench region is also referred to herein as a depressed-index cladding region and trench volume is also referred to herein as $V_3$.

The "mode field diameter" or "MFD" of an optical fiber is defined in Eq. (6) as:

$$MFD = 2w \tag{6}$$

$$w^2 = 2\frac{\int_0^\infty (f(r))^2 r dr}{\int_0^\infty \left(\frac{df(r)}{dr}\right)^2 r dr}$$

where f(r) is the transverse component of the electric field distribution of the guided optical signal and r is radial position in the fiber. "Mode field diameter" or "MFD" depends on the wavelength of the optical signal and is reported herein for wavelengths of 1310 nm, 1550 nm, and 1625 nm. Specific indication of the wavelength will be made when referring to mode field diameter herein. Unless otherwise specified, mode field diameter refers to the $LP_{01}$ mode at the specified wavelength. "Effective area" of an optical fiber is defined in Eq. (7) as:

$$A_{eff} = \frac{2\pi\left[\int_0^\infty (f(r))^2 r dr\right]^2}{\int_0^\infty (f(r))^4 r dr} \tag{7}$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

The term "attenuation," as used herein, is the loss of optical power as the signal travels along the optical fiber. Attenuation was measured as specified by the IEC-60793-1-40 standard, "Attenuation measurement methods."

The bend resistance of an optical fiber, expressed as "bend loss" herein, can be gauged by induced attenuation under prescribed test conditions as specified by the IEC-60793-1-47 standard, "Measurement methods and test procedures—Macrobending loss." For example, the test condition can entail deploying or wrapping the fiber one or more turns around a mandrel of a prescribed diameter, e.g., by wrapping 1 turn around either a 15 mm, 20 mm, or 30 mm or similar diameter mandrel (e.g. "1×15 mm diameter bend loss" or the "1×20 mm diameter bend loss" or the "1×30 mm diameter bend loss") and measuring the increase in attenuation per turn.

"Cable cutoff wavelength," or "cable cutoff," as used herein, refers to the 22 m cable cutoff test as specified by the IEC 60793-1-44 standard, "Measurement methods and test procedures-Cut-off wavelength."

The optical fibers disclosed herein include a core region, a cladding region surrounding the core region, and a coating surrounding the cladding region. The core region and cladding region are glass. The cladding region includes multiple regions. The multiple cladding regions are preferably concentric regions. The cladding region includes an inner cladding region, a depressed-index cladding region, and an outer cladding region. The inner cladding region surrounds and is directly adjacent to the core region. The depressed-index cladding region surrounds and is directly adjacent to the inner cladding region such that the depressed-index cladding region is disposed between the inner cladding and the outer cladding in a radial direction. The outer cladding region surrounds and is directly adjacent to the depressed-index cladding region. The depressed-index cladding region has a lower relative refractive index than the inner cladding and the outer cladding region. The depressed-index cladding region may also be referred to herein as a trench or trench region. The relative refractive index of the inner cladding region may be less than, equal to, or greater than the relative refractive index of the outer cladding region. The depressed-index cladding region may contribute to a reduction in bending losses and microbending sensitivity. The core region, inner cladding region, depressed-index cladding region, and outer cladding region are also referred to as core, cladding, inner cladding, depressed-index cladding, and outer cladding, respectively.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the depressed-index cladding region, radial position $r_4$ and relative refractive index $\Delta_4$ or $\Delta_4(r)$ refer to the outer cladding region, radial position $r_5$ refers to the primary coating, radial position $r_6$ refers to the secondary coating, and the radial position $r_7$ refers to the optional tertiary coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_{4min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the central core region is substantially cylindrical in shape and that the surrounding inner cladding region, depressed-index cladding region, outer cladding region, primary coating, and secondary coating are substantially annular in shape. Annular regions are characterized in terms of an inner radius and an outer radius. Radial positions $r_1$, $r_2$, $r_3$, $r_4$, $r_5$, $r_6$ and $r_7$ refer herein to the outermost radii of the core, inner cladding, depressed-index cladding, outer cladding, primary coating, secondary coating, and tertiary coating, respectively. The radius $r_6$ also corresponds to the outer radius of the optical fiber in embodiments without a tertiary coating. When a tertiary coating is present, the radius $r_7$ corresponds to the outer radius of the optical fiber.

When two regions are directly adjacent to each other, the outer radius of the inner of the two regions coincides with the inner radius of the outer of the two regions. The optical fiber, for example, includes a depressed-index cladding region surrounded by and directly adjacent to an outer cladding region. The radius $r_3$ corresponds to the outer radius of the depressed-index cladding region and the inner radius of the outer cladding region. The relative refractive index profile also includes a depressed-index cladding region surrounding and directly adjacent to an inner cladding region. The radial position $r_2$ corresponds to the outer radius of the inner cladding region and the inner radius of the depressed-index cladding region. Similarly, the radial position $r_1$ corresponds to the outer radius of the core region and the inner radius of the inner cladding region.

The difference between radial position $r_2$ and radial position $r_1$ is referred to herein as the thickness of the inner cladding region. The difference between radial position $r_3$ and radial position $r_2$ is referred to herein as the thickness of the depressed-index cladding region. The difference between radial position $r_4$ and radial position $r_3$ is referred to herein as the thickness of the outer cladding region. The difference between radial position $r_5$ and radial position $r_4$ is referred to herein as the thickness of the primary coating. The difference between radial position $r_6$ and radial position $r_5$ is referred to herein as the thickness of the secondary coating.

As will be described further hereinbelow, the relative refractive indices of the core region, inner cladding region, depressed-index cladding region, and outer cladding region may differ. Each of the regions may be formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is silica glass. When the undoped glass is silica glass, updopants include Cl, Br, Ge, Al, P, Ti, Zr, Nb, and Ta, and downdopants include F and B. Regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different regions. Downdoping can also be accomplished by incorporating voids in silica glass. Voids correspond to localized regions filled with air or other gas (e.g. $N_2$, Ar, $SO_2$, $CO_2$, Kr, $O_2$) and/or evacuated spaces that extend for a length less than the full length of the glass fiber. The voids are preferably distributed randomly or non-periodically along the length of the glass fiber.

Values of Young's modulus, % elongation, and tear strength refer to values as determined under the measurement conditions by the procedures described herein.

Reference will now be made in detail to illustrative embodiments of the present description.

One embodiment relates to an optical fiber. The optical fiber includes a glass fiber surrounded by a coating. An example of an optical fiber is shown in schematic cross-sectional view in FIG. 1. Optical fiber 10 includes glass fiber 11 surrounded by primary coating 16 and secondary coating 18. In some embodiments, secondary coating 18 may include a pigment. Further description of glass fiber 11, primary coating 16, and secondary coating 18 is provided below. Additionally, one or more tertiary ink layers may surround secondary coating 18.

Figure 2:
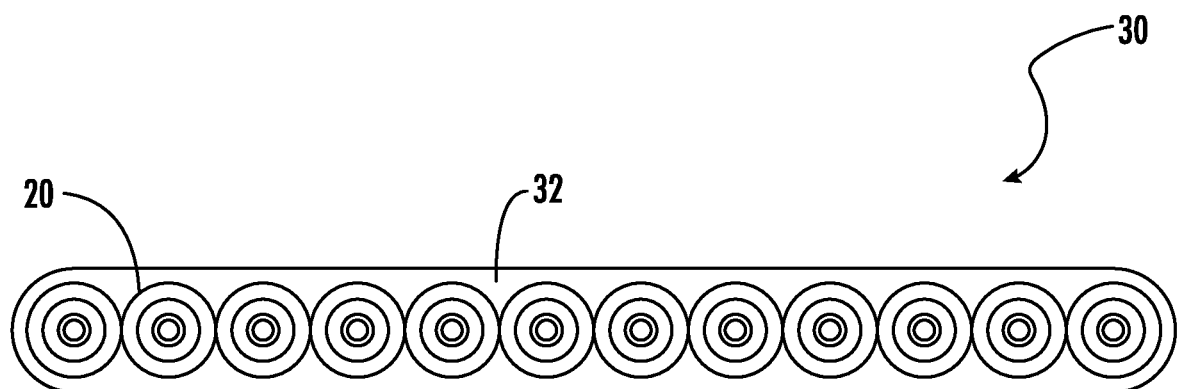
FIG. 2 is a schematic view of an optical fiber ribbon according to embodiments of the present disclosure.

FIG. 2 illustrates an optical fiber ribbon 30, which may include a plurality of optical fibers 20 and a matrix 32 encapsulating the plurality of optical fibers. Optical fibers 20 each include a core region, a cladding region, a primary coating, and a secondary coating as described above. Optical fibers 20 may also include a tertiary coating as noted above.

As shown in FIG. 2, optical fibers 20 are aligned relative to one another in a substantially planar and parallel relationship. The optical fibers in fiber optic ribbon 30 are encapsulated by the ribbon matrix 32 in any of several known configurations (e.g., edge-bonded ribbon, thin-encapsulated ribbon, thick-encapsulated ribbon, or multi-layer ribbon) by conventional methods of making fiber optic ribbons. Fiber optic ribbon 30 in the embodiment of FIG. 2 contains twelve (12) optical fibers 20. However, it is contemplated that any number of optical fibers 20 (e.g., two or more) may be employed to form fiber optic ribbon 30 for a particular use. Ribbon matrix 32 has tensile properties similar to the tensile properties of a secondary coating and can be formed from the same, similar, or different composition used to prepare a secondary coating.

Figure 3:
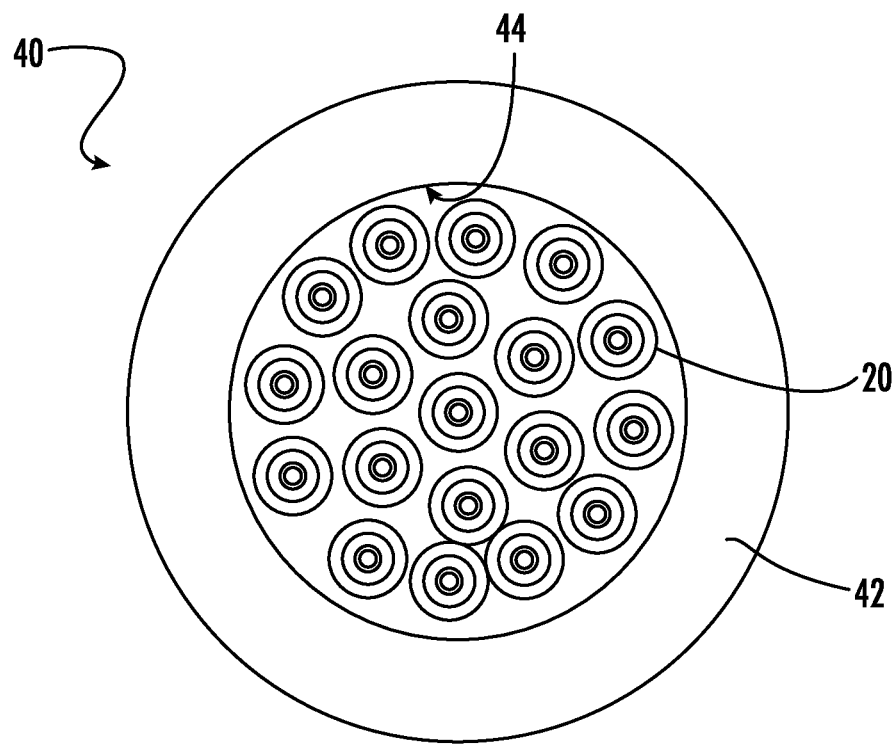
FIG. 3 is a schematic view of an optical fiber cable according to embodiments of the present disclosure.

FIG. 3 illustrates an optical fiber cable 40 that includes a plurality of optical fibers 20 surrounded by jacket 42. In some embodiments, optical fiber cable 40 is a submarine cable. Optical fibers 20 may be densely or loosely packed into a conduit enclosed by an inner surface 44 of jacket 42. The number of fibers placed in jacket 42 is referred to as the "fiber count" of optical fiber cable 40. As discussed further below, the optical fibers of the present disclosure have a reduced diameter, thus providing a high "fiber count."

The jacket 42 is formed from an extruded polymer material and may include multiple concentric layers of polymers or other materials. Optical fiber cable 40 may include one or more strengthening members (not shown) embedded within jacket 42 or placed within the conduit defined by inner surface 44. Strengthening members include fibers or rods that are more rigid than jacket 42. The strengthening member may be made from metal, braided steel, glass-reinforced plastic, fiber glass, or other suitable material. Optical fiber cable 40 may include other layers surrounded by jacket 42 such as, for example, armor layers, moisture barrier layers, rip cords, etc. Furthermore, optical fiber cable 40 may have a stranded, loose tube core or other fiber optic cable construction.

Glass Fiber

As shown in FIG. 1, glass fiber 11 includes a core region 12 and a cladding region 14, as is known in the art. Core region 12 has a higher refractive index than cladding region 14, and glass fiber 11 functions as a waveguide. In many applications, core region 12 and cladding region 14 have a discernible core-cladding boundary. Alternatively, core region 12 and cladding region 14 can lack a distinct boundary.

In some embodiments, core region 12 has a refractive index that varies with distance from the center of the glass fiber. For example, core region 12 may have a relative refractive index profile with an α-profile (as defined by Eq. (3) above) with an α value that is greater than or equal to 2 and less than or equal to 100, or for example between 2 and 10, between 2 and 6, between 2 and 4, between 4 and 20, between 6 and 20, between 8 and 20, between 10 and 20, or between 10 and 40.

Figure 4:
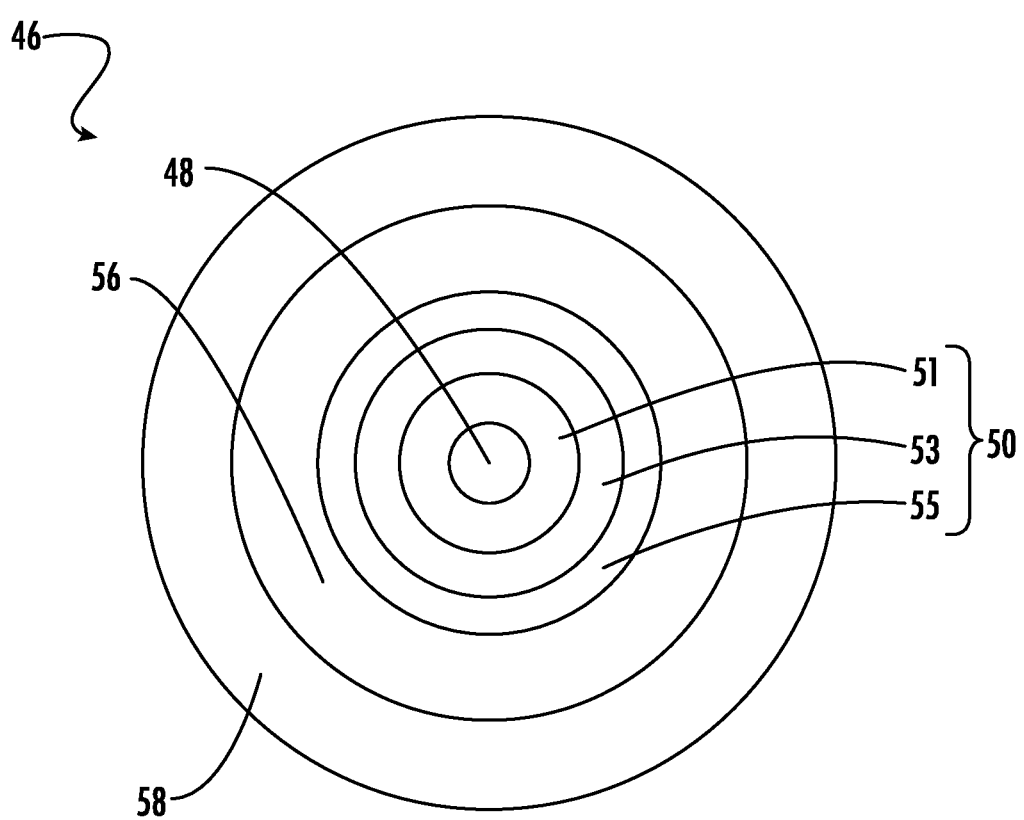
FIG. 4 is a schematic view of a cross-section of an optical fiber according to embodiments of the present disclosure.

A schematic cross-sectional depiction of an exemplary optical fiber is shown in FIG. 4. As discussed above, the optical fiber of FIG. 4 may be used in a submarine cable. In FIG. 4, optical fiber 46 includes core region 48, cladding region 50, primary coating 56, and secondary coating 58. Cladding region 50 includes inner cladding region 51, depressed-index cladding region 53, and outer cladding region 55. A tertiary layer (e.g. ink layer) optionally surrounds or is directly adjacent to the secondary coating.

As discussed above, optical fiber 46 may have a reduced glass diameter and/or a reduced coating diameter. Such reduced diameter(s) may increase the fiber density (e.g., "fiber count") of optical fibers 46 when used, for example, in a standard submarine cable design. In order to provide suitable attenuation and microbending characteristics with the smaller diameter profile of optical fiber 46, the properties of the fiber are specifically tailored, as discussed further below.

A representative relative refractive index profile for a glass fiber, according to embodiments of the present disclosure, is shown in FIG. 5. The profile of optical fiber 60 of FIG. 5 shows a core region (1) with outer radius $r_1$ and relative refractive index $\Delta_1$ with maximum relative refractive index $\Delta_{1max}$, an inner cladding region (2) extending from radial position $r_1$ to radial position $r_2$ and having relative refractive index $\Delta_2$, a depressed-index cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$. In the profile of FIG. 5, the depressed-index cladding region (3) may be referred to herein as a trench and has a constant or average relative refractive index that is less than the relative refractive indices of the inner cladding region (2) and the outer cladding region (4). Core region (1) has the highest average and maximum relative refractive index in the profile. Core region (1) may include a lower index region at or near the centerline (known in the art as a "centerline dip") (not shown). Core region (1) may include a higher index region at or near the centerline (referred to as a "centerline spike") (not shown).

In the relative refractive index profile of FIG. 5, the core region (1) of the glass fiber has an α-profile with an α value greater than or equal to 2 and less than or equal to 20. The radial position $r_0$ (corresponding to $\Delta_{1max}$) of the α-profile corresponds to the centerline (r=0) of the fiber and the radial position $r_z$ of the α-profile corresponds to the core radius $r_1$. In embodiments with a centerline dip, the radial position $r_0$ is slightly offset from the centerline of the fiber. In some embodiments, the relative refractive index $\Delta_1$ continuously decreases in the radial direction away from the centerline. In other embodiments, relative refractive index $\Delta_1$ varies over some radial positions between the centerline and $r_1$, and also includes a constant or approximately constant value over other radial positions between the centerline and $r_1$.

In FIG. 5, transition region 61 from inner cladding region (2) to depressed-index cladding region (3) and transition region 62 from depressed-index cladding region (3) to outer cladding region (4) are shown as step changes. It is to be understood that a step change is an idealization and that transition region 61 and/or transition region 62 may not be strictly vertical in practice as depicted in FIG. 5. Instead, transition region 61 and/or transition region 62 may have a slope or curvature. When transition region 61 and/or transition region 62 are non-vertical, the inner radius $r_2$ and outer radius $r_3$ of depressed-index cladding region (3) correspond to the mid-points of transition regions 61 and 62, respectively. The mid-points correspond to half of the depth 63 of the depressed-index cladding region (3).

The relative ordering of relative refractive indices $\Delta_1$, $\Delta_2$, $\Delta_3$, $\Delta_4$ in the relative refractive index profile shown in FIG. 5 satisfy the conditions $\Delta_{1max}>\Delta_4>\Delta_3$ and $\Delta_{1max}>\Delta_2>\Delta_3$. The values of $\Delta_2$ and $\Delta_4$ may be equal or either may be greater than the other, but both $\Delta_2$ and $\Delta_4$ are between $\Delta_{1max}$ and $\Delta_3$.

The relative refractive indices $\Delta_1$, $\Delta_2$, $\Delta_3$, and $\Delta_4$ are based on the materials used in the core region, inner cladding region, depressed-index cladding region, and outer cladding region. A description of these material with regard to the relative refractive indices $\Delta_1$, $\Delta_2$, $\Delta_3$, and $\Delta_4$ is provided below.

Core Region

The core region comprises silica glass. The silica glass of the core region may be undoped silica glass, updoped silica glass, and/or downdoped silica glass. Updoped silica glass includes silica glass doped with an alkali metal oxide (e.g. $Na_2O$, $K_2O$, $Li_2O$, $Cs_2O$, or $Rb_2O$) and/or a halogen. Downdoped silica glass includes silica glass doped with fluorine.

In some embodiments, the silica glass of the core region is Ge-free and/or Cl-free; that is the core region comprises silica glass that lacks germanium and/or chlorine.

The core region may comprise silica glass doped with at least one alkali metal, such as, lithium (Li), sodium (Na), potassium (K), rubidium (Rb), cesium (Cs) and/or francium (Fr). In some embodiments, the silica glass is doped with a combination of sodium, potassium, and rubidium. The silica glass may have a peak alkali concentration in the range from about 10 ppm to about 500, or in the range from about 20 ppm to about 450 ppm, or in the range from about 50 ppm to about 300 ppm, or in the range from about 10 ppm to about 200 ppm, or in the range from about 10 ppm to about 150 ppm. The alkali metal doping within the disclosed ranges results in lowering of Rayleigh scattering, thereby proving a lower optical fiber attenuation.

In some embodiments, the core region comprises silica glass doped with an alkali metal and doped with fluorine as a downdopant. FIGS. 5 and 6 show exemplary embodiments of downdoped silica glass. The concentration of fluorine in the glass fiber is in the range from about 0.1 wt % to about 2.5 wt %, or in the range from about 0.25 wt % to about 2.25 wt %, or in the range from about 0.3 wt % to about 2.0 wt %.

In yet other embodiments, the core region comprises silica glass doped with a halogen such as chlorine. FIGS. 6B-6D show exemplary embodiments of silica glass doped with chlorine. The concentration of chlorine in the glass fiber is in a range from about 0.4 wt % to about 2.2 wt %, or about 0.6 wt % to about 2.0 wt %. or about 1.0 wt % to about 1.9 wt %. or about 1.6 wt %, or about 1.8 wt %.

The radius $r_1$ of the core region is in the range from about from about 3.0 microns to about 6.0 microns, or in the range from about 3.5 microns to about 5.5 microns, or in the range from about 4.0 microns to about 5.0 microns, or in the range from about 4.2 microns to about 4.7 microns. In some embodiments, the core region includes a portion with a constant or approximately constant relative refractive index that has a width in the radial direction of at least 1.0 micron, or at least 2.0 microns, or at least 3.0 microns, or at least 4.0 microns, or in the range from 1.0 microns to 4.0 microns, or in the range from 2.0 microns to 3.0 microns. In some embodiments, the portion of the core region having a constant or approximately constant relative refractive index has a relative refractive index of $\Delta_{1min}$.

The relative refractive index $\Delta_1$ or $\Delta_{1max}$ of the core region is in the range from about −0.15% to about 0.30%, or in the range from about −0.10% to about 0.20%, or in the range from about −0.05% to about 0.15%, or in the range from about 0% to about 0.10%. The minimum relative refractive index $\Delta_{1min}$ of the core is in the range from about −0.20% to about −0.50%, or in the range from about −0.30% to about −0.40%, or in the range from about −0.32% to about 0.37%. The difference $\Delta_{1max}$ to $\Delta_{1min}$ is greater than 0.05%, or greater than 0.10%, or greater than 0.15%, or greater than 0.20%, or in the range from 0.05% to 0.40%, or in the range from 0.10% to 0.35%.

Inner Cladding Region

The inner cladding region is comprised of downdoped silica glass that is doped with fluorine and/or silica glass with voids. The average concentration of downdopant in the inner cladding region is greater than the average concentration of downdopant in the core region. In some embodiments, the concentration of fluorine in the inner cladding region is in the range from about 0.50 wt % to about 2.00 wt %, or in the range from about 0.60 wt % to about 1.00 wt %, or in the range from about 0.70 wt % to about 0.80 wt %.

The relative refractive index $\Delta_2$ or $\Delta_{2max}$ of the inner cladding region is in the range from about −0.20% to about −0.50%, or in the range from about −0.25% to about −0.45%, or in the range from about −0.30% to about −0.40%, or in the range from about −0.33% to about −0.37%. The relative refractive index $\Delta_2$ is preferably constant or approximately constant. The difference $\Delta_{1max}-\Delta_2$ (or the difference $\Delta_{1max}-\Delta_{2max}$) is greater than about 0.25%, or greater than about 0.30%, or greater than about 0.35%, or in the range from about 0.25% to about 0.45%, or in the range from about 0.30% to about 0.40%.

The radius $r_2$ of the inner cladding region is in the range from about 7.0 microns to about 15.0 microns, or in the range from about 7.5 microns to about 13.0 microns, or in the range from about 8.0 microns to about 12.0 microns, or in the range from about 8.5 microns to about 11.5 microns, or in the range from about 9.0 microns to about 11.0 microns, or in the range from about 9.5 microns to about 10.5 microns. The thickness $r_2-r_1$ of the inner cladding region is in the range from about 3.0 microns to about 10.0 microns, or from about 4.0 microns to about 9.0 microns, or from about 4.5 microns to about 7.0 microns.

Depressed-Index Cladding Region

The depressed-index cladding region comprises downdoped silica glass. As discussed above, the preferred downdopant is fluorine. The concentration of fluorine in the depressed-index cladding region is in the range from about 0.30 wt % to about 2.50 wt %, or in the range from about 0.60 wt % to about 2.25 wt %, or in the range from about 0.90 wt % to about 2.00 wt %.

The relative refractive index $\Delta_3$ or $\Delta_{3min}$ is in the range from about −0.30% to about −0.80%, or in the range from about −0.40% to about −0.70%, or in the range from about −0.50% to about −0.65%. The relative refractive index $\Delta_3$ is preferably constant or approximately constant. The difference $\Delta_{1max}-\Delta_3$ (or the difference $\Delta_{1max}-\Delta_{3min}$, or the difference $\Delta_1-\Delta_3$, or the difference $\Delta_1-\Delta_{3min}$) is greater than about 0.50%, or greater than about 0.55%, or greater than about 0.6%, or in the range from about 0.50% to about 0.80%, or in the range from about 0.55% to about 0.75%. The difference $\Delta_2-\Delta_3$ (or the difference $\Delta_2-\Delta_{3min}$, or the difference $\Delta_{2max}-\Delta_3$, or the difference $\Delta_{2max}-\Delta_{3min}$) is greater than about 0.10%, or greater than about 0.20%, or greater than about 0.30%, or in the range from about 0.10% to about 0.60%, or in the range from about 0.20% to about 0.60%.

The inner radius of the depressed-index cladding region is $r_2$ and has the values specified above. The outer radius $r_3$ of the depressed-index cladding region is in the range from about 10.0 microns to 20.0 microns, or in the range from about 12.0 microns to about 19.5 microns, or in the range from about 13.0 microns to about 19.0 microns, or in the range from about 13.5 microns to about 18.5 microns, or in the range from about 14.0 microns to about 18.0 microns, or in the range from about 14.5 microns to about 17.5 microns. The thickness $r_3-r_2$ of the depressed-index cladding region is in the range from 0.5 microns to 12.0 microns, or in the range from about 1.0 microns to about 10.0 microns, or in the range from about 1.5 microns to about 9.0 microns, or in the range from about 2.0 microns to about 8.0 microns.

The depressed-index cladding region may be an offset trench design with a trench volume of about 30% $\Delta$-micron$^2$ or greater, or about 50% $\Delta$-micron$^2$ or greater, or about 70% $\Delta$-micron$^2$ or less, or about 30% $\Delta$-micron$^2$ or greater and about 70% $\Delta$-micron$^2$ or less, or about 50% $\Delta$-micron$^2$ or greater and about 70% $\Delta$-micron$^2$ or less. Trench volumes lower than the disclosed ranges have reduced bending performance, and trench volumes higher than the disclosed ranges no longer operate as single mode fibers.

The offset trench designs disclosed herein provide advantages over traditional trench designs that are adjacent to the core region. More specifically, the offset trench designs disclosed herein reduce confinement of the fundamental mode and provide improved band loss at large bend diameters (e.g., bend diameters >25 mm) for target optical fiber mode field diameter and cable cutoff characteristics. Furthermore, the trench designs disclosed herein have a depressed index trench region, which advantageously confines the intensity profile of the fundamental LP01 mode propagating through the optical fiber, thereby reducing the optical fiber mode field diameter.

Outer Cladding Region

The outer cladding region is comprised of downdoped silica glass that is doped with fluorine and/or silica glass with voids. The average concentration of downdopant in the outer cladding region is greater than the average concentration of downdopant in the core region. In some embodiments, the concentration of fluorine in the outer cladding region is in the range from about 0.50 wt % to about 2.00 wt %, or in the range from about 0.60 wt % to about 1.00 wt %, or in the range from about 0.70 wt % to about 0.80 wt %.

The relative refractive index $\Delta_4$ or $\Delta_{4max}$ of the outer cladding region is in the range from about −0.20% to about −0.50%, or in the range from about −0.25% to about −0.45%, or in the range from about −0.30% to about −0.40%, or in the range from about −0.33% to about 0.37%. The relative refractive index $\Delta_4$ is preferably constant or approximately constant. As shown in FIG. 5, the relative refractive index $\Delta_4$ may be equal to the relative refractive index $\Delta_2$.

The inner radius of the outer cladding region is $r_3$ and has the values specified above. The outer radius $r_4$ is preferably low to minimize the diameter of the glass fiber to facilitate high fiber count in a cable. The outer radius $r_4$ of the outer cladding region is less than or equal to 65 microns, or less than or equal to 62.5 microns, or less than or equal to 60.0 microns, or less than or equal to 57.5 microns, or less than or equal to 55.0 microns, or less than or equal to 52.5 microns, or less than or equal to 50.0 microns, or in the range from 37.5 microns to 62.5 microns, or in the range from 40.0 microns to 60.0 microns, or in the range from 42.5 microns to 57.5 microns, or in the range from 45.0 microns to 55.0 microns. Thus, for example, the diameter of the cladding region (i.e., outer radius $r_4$ multiplied by 2) is about 130 microns or less, or about 125 microns or less, or about 120 microns or less, or about 115 microns or less, or about 110 microns or less, or about 105 microns or less, or about 100 microns or less, or about 90 microns or less, or about 80 microns or less, or about 75 microns or less. The thickness $r_4-r_3$ of the outer cladding region is in the range from about 10.0 microns to about 50.0 microns, or in the range from about 15.0 microns to about 45.0 microns, or in the range from about 20.0 microns to about 40.0 microns, or in the range from about 25.0 microns to about 35.0 microns.

Optical Fiber Characteristics

The optical fibers according to the embodiments of the present disclosure may have a mode field diameter in the range of about 9 microns to about 9.5 microns at 1310 nm and in the range of about 10 microns to about 10.5 microns at 1550 nm with a cable cutoff of less than about 1530 nm. In some embodiments, the cable cutoff is less than about 1500 nm, or less than about 1450 nm, or less than about 1400 nm, or less than about 1300 nm, or less than about 1260 nm.

Additionally, optical fibers according to the embodiments of the present disclosure may have an effective area at 1550 nm of about 100 micron$^2$ or less, or about 90 micron$^2$ or less, or about 80 micron$^2$ or less, or about 70 micron$^2$ or less, or in the range of about 70 micron$^2$ to about 90 micron$^2$, or in the range from about 75 micron$^2$ to about 85 micron$^2$, or about 80 micron$^2$.

The attenuation of the optical fibers disclosed herein is less than or equal to 0.175 dB/km, or less than or equal to 0.170 dB/km, or less than or equal to 0.165 dB/km, or less than or equal to 0.160 dB/km, or less than or equal to 0.155 dB/km, or less than or equal to 0.150 dB/km at a wavelength of 1550 nm.

As shown in FIG. 5, optical fiber 60 provides an exemplary embodiment of an optical fiber with an alkali doped core, a relative refractive index $\Delta_1$ of the core region (1) between about −0.3% to about −0.42%, and a core radius ($r_1$) between about 4 microns and about 6.5 microns. Additionally, an inner cladding region thickness of optical fiber 60 is between about 2 microns and about 12 microns. Optical fiber 60 has an off-set trench design with a trench volume of 54.5% $\Delta$-micron$^2$. The cladding of optical fiber 60 is fluorine-doped and the depressed-index cladding region has a radius ($r_3$) of about 17.5 microns. The optical properties of optical fiber 60 are shown in Table 1 below.

TABLE 1

| Optical Properties of Optical Fiber 60 | |
|---|---|
| Mode Field Diameter (at 1310 nm) | 9.22 microns |
| Mode Field Diameter (at 1550 nm) | 10.27 microns |
| Mode Field Diameter (at 1625 nm) | 10.61 microns |
| Zero Dispersion Wavelength | 1319 nm |
| Cable Cutoff | 1315 nm |
| Trench Volume | 54.5% $\Delta$-micron$^2$ |
| 15 nm Diameter Bend Loss | 0.04 dB/turn |
| 20 nm Diameter Bend Loss | 0.009 dB/turn |
| 30 nm Diameter Bend Loss | 0.001 dB/turn |

Figure 6A:
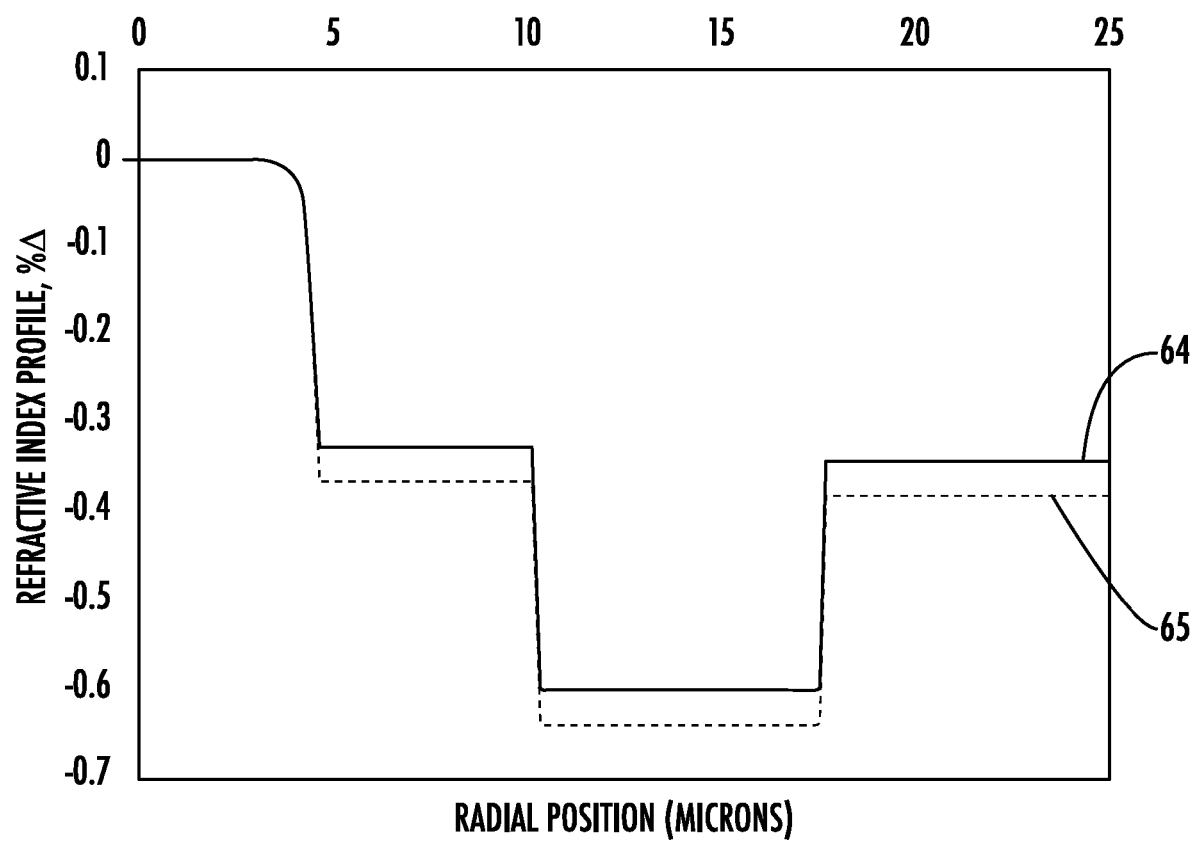
FIGS. 6A-6E depict relative refractive index profiles of optical fibers according to embodiments of the present disclosure.
Figure 6B:
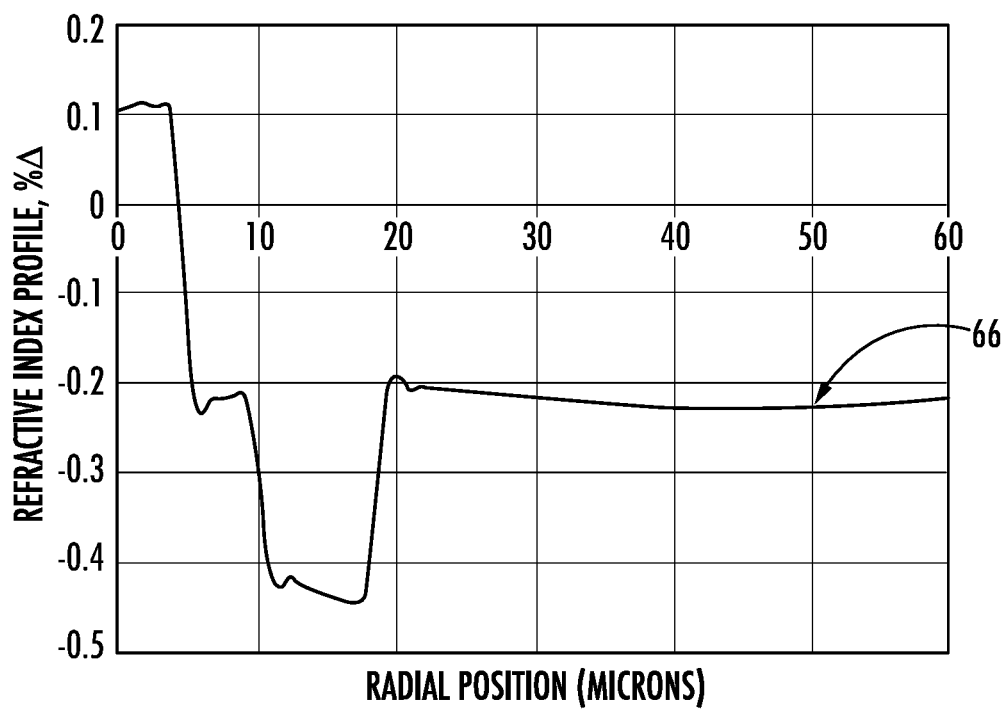
Figure 6C:
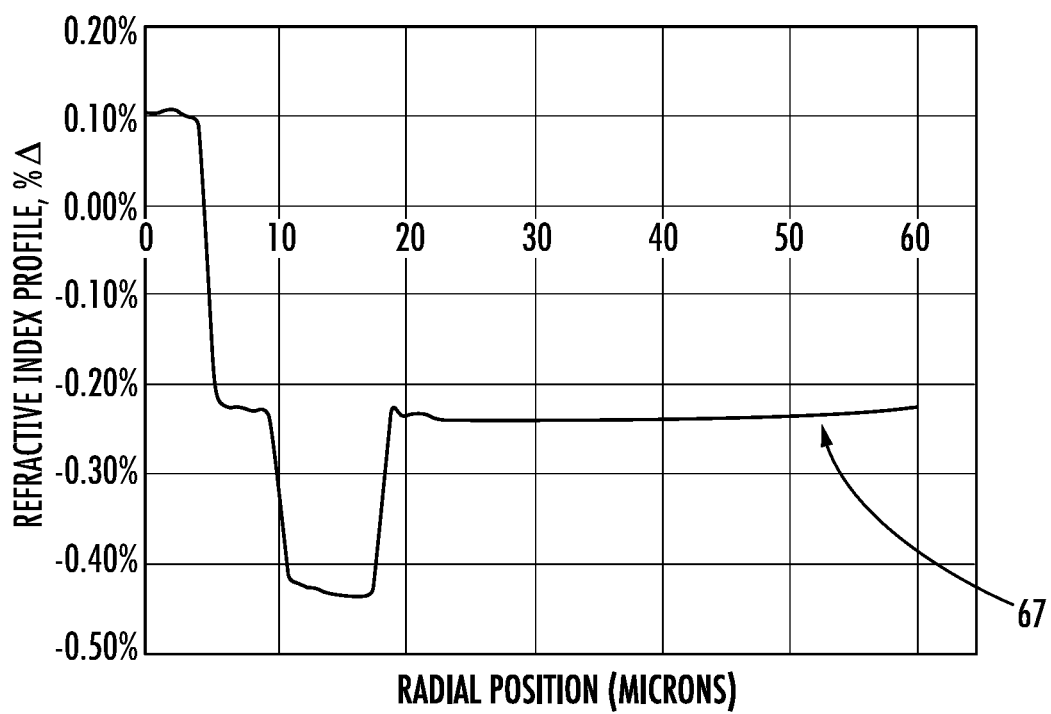
Figure 6D:
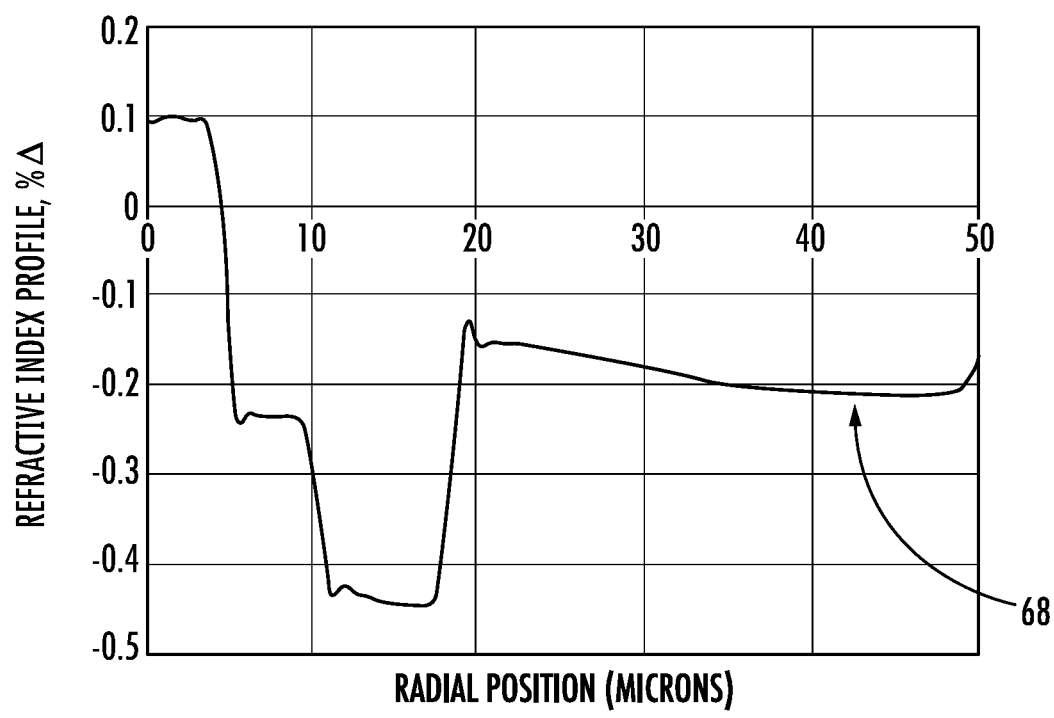

FIG. 6A depicts second and third exemplary embodiments of optical fibers, 64, 65 with an alkali doped core and a trench volume of greater than about 50% $\Delta$-micron$^2$, and wherein the cladding is fluorine doped and the depressed-index cladding region has a radius ($r_3$) of about 17.5 microns. As shown in Table 2 below, optical fiber 64 results in a mode field diameter of 9.07 microns at 1310 nm, and optical fiber 65 results in a mode field diameter of 9.39 microns at 1310 nm. The optical properties of optical fibers 64 and 65 are shown in Table 2 below.

TABLE 2

| Optical Properties of Optical Fibers 64 and 65 | | |
|---|---|---|
| | Optical Fiber 64 | Optical Fiber 65 |
| Mode Field Diameter (at 1310 nm) | 9.07 microns | 9.39 microns |
| Mode Field Diameter (at 1550 nm) | 10.08 microns | 10.48 microns |
| Mode Field Diameter (at 1625 nm) | 10.41 microns | 10.83 microns |
| Zero Dispersion Wavelength | 1319 nm | 1320 nm |
| Cable Cutoff | 1419 nm | 1339 nm |
| Trench Volume | 55% $\Delta$-micron$^2$ | 55% $\Delta$-micron$^2$ |
| 15 nm Diameter Bend Loss | 0.0137 dB/turn | 0.042 dB/turn |
| 20 nm Diameter Bend Loss | 0.0003 dB/turn | 0.009 dB/turn |
| 30 nm Diameter Bend Loss | 0.0002 dB/turn | 0.001 dB/turn |

FIG. 6B depicts a fourth exemplary embodiment of optical fiber 66 with a chlorine doped core having a chlorine concentration of about 1.8 wt %. Optical fiber 66 also comprises an inner cladding, a depressed-index cladding region, and an outer cladding of silica doped fluorine. The inner cladding has a fluorine concentration of 0.73 wt %, the depressed-index cladding region has a fluorine concentration of 1.5 wt %, and the outer cladding has a fluorine concentration of 0.73 wt %. Furthermore, optical fiber 66 has a glass outer diameter of 125 microns, a primary coating outer diameter of 167 microns, and a secondary coating outer diameter of 200 microns. The optical properties of optical fiber 66 are shown in Table 3 below.

TABLE 3

Optical Properties of Optical Fiber 66

|  | Optical Fiber 66 |
| --- | --- |
| Attenuation (at 1310 nm loss) | 0.309 dB/km |
| Attenuation (at 1550 nm loss) | 0.175 dB/km |
| Mode Field Diameter (at 1550 nm) | 10.02 microns |
| Effective Area (at 1550 nm) | 78.85 microns$^2$ |
| Cable Cutoff | 1296 nm |
| 15 nm Diameter Bend Loss (at 1550 nm) | 0.066 dB/turn |
| 20 nm Diameter Bend Loss (at 1550 nm) | 0.004 dB/turn |
| 30 nm Diameter Bend Loss (at 1550 nm) | 0.001 dB/turn |

FIG. 6C depicts a fifth exemplary embodiment of optical fiber 67 with a chlorine doped core having a chlorine concentration of about 1.8 wt %. Optical fiber 67 also comprises an inner cladding, a depressed-index cladding region, and an outer cladding of silica doped fluorine. The inner cladding has a fluorine concentration of 0.73 wt %, the depressed-index cladding region has a fluorine concentration of 1.5 wt %, and the outer cladding has a fluorine concentration of 0.73 wt %. Furthermore, optical fiber 67 has a glass outer diameter of 125 microns, a primary coating outer diameter of 167 microns, and a secondary coating outer diameter of 200 microns. Optical fiber 67 was drawn under conditions such that the during the draw process, the fiber was slow cooled in a high temperature furnace. More specifically, during the draw process, optical fiber 67 was slow cooled in a furnace operating at 900° C. for a period of 0.3 seconds. The optical properties of optical fiber 67 are shown in Table 4 below.

TABLE 4

Optical Properties of Optical Fiber 67

|  | Optical Fiber 67 |
| --- | --- |
| Attenuation (at 1550 nm loss) | 0.175 dB/km |
| Mode Field Diameter (at 1550 nm) | 10.02 microns |
| Effective Area (at 1550 nm) | 78.0 microns$^2$ |
| Cable Cutoff | 1394 nm |

FIG. 6D depicts a sixth exemplary embodiment of optical fiber 68 with a chlorine doped core having a chlorine concentration of about 1.8 wt %. Optical fiber 68 also comprises an inner cladding, a depressed-index cladding region, and an outer cladding of silica doped fluorine. The inner cladding has a fluorine concentration of 0.73 wt %, the depressed-index cladding region has a fluorine concentration of 1.5 wt %, and the outer cladding has a fluorine concentration of 0.73 wt %. Furthermore, optical fiber 68 has a glass outer diameter of 100 microns, a primary coating outer diameter of 125 microns, and a secondary coating outer diameter of 160 microns. The optical properties of optical fiber 68 are shown in Table 5 below.

TABLE 5

Optical Properties of Optical Fiber 68

|  | Optical Fiber 68 |
| --- | --- |
| Attenuation (at 1310 nm loss) | 0.33 dB/km |
| Attenuation (at 1550 nm loss) | 0.196 dB/km |
| Mode Field Diameter (at 1550 nm) | 10.33 microns |
| Cable Cutoff | 1183 nm |
| 15 nm Diameter Bend Loss (at 1550 nm) | 0.047 dB/turn |
| 20 nm Diameter Bend Loss (at 1550 nm) | 0.01 dB/turn |

Figure 6E:
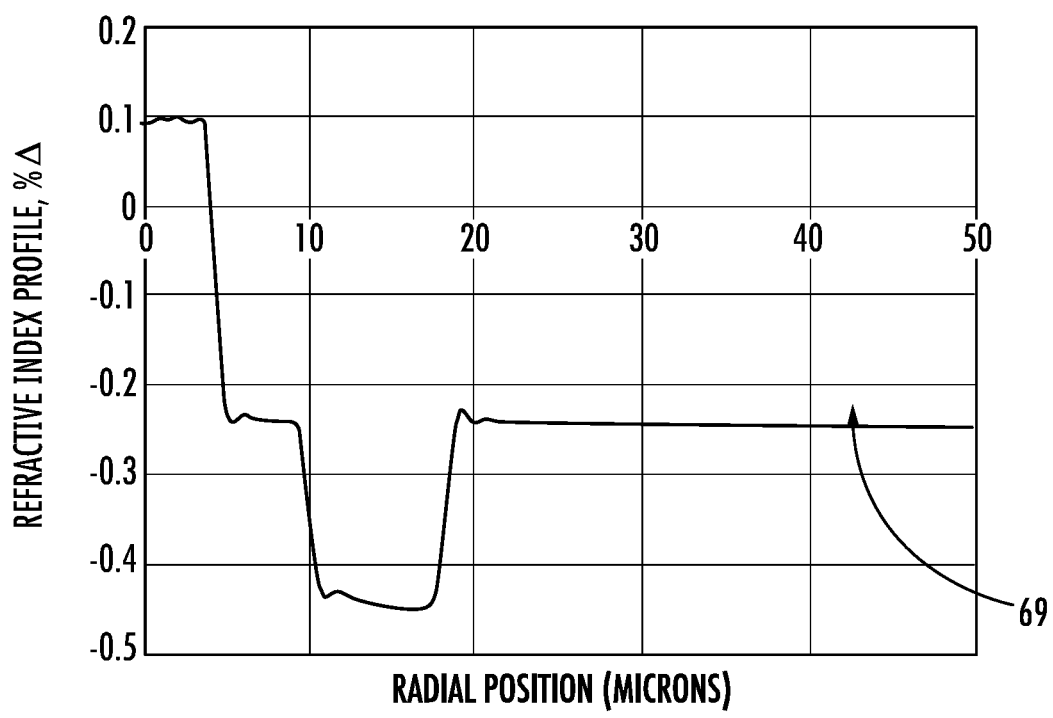

FIG. 6E depicts a seventh exemplary embodiment of optical fiber 69 with a chlorine doped core having a chlorine concentration of about 1.8 wt %. Optical fiber 69 also comprises an inner cladding, a depressed-index cladding region, and an outer cladding of silica doped fluorine. The inner cladding has a fluorine concentration of 0.73 wt %, the depressed-index cladding region has a fluorine concentration of 1.4 wt %, and the outer cladding has a fluorine concentration of 0.73 wt %. Furthermore, optical fiber 69 has a glass outer diameter of 100 microns, a primary coating outer diameter of 131 microns, and a secondary coating outer diameter of 172 microns. The optical properties of optical fiber 69 are shown in Table 6 below.

TABLE 6

Optical Properties of Optical Fiber 69

|  | Optical Fiber 69 |
| --- | --- |
| Attenuation (at 1310 nm loss) | 0.330 dB/km |
| Attenuation (at 1550 nm loss) | 0.179 dB/km |
| Attenuation (at 1625 nm loss) | 0.192 dB/km |
| Mode Field Diameter (at 1550 nm) | 10.6 microns |
| Cable Cutoff | 1308 nm |
| 10 nm Diameter Bend Loss (at 1550 nm) | 0.674 dB/turn |
| 15 nm Diameter Bend Loss (at 1550 nm) | 0.071 dB/turn |

The off-set trench design of optical fibers 60 and 64-69 provide improved microbending sensitivity for the smaller diameter fibers disclosed herein. More specifically, the off-set trench design disclosed herein provides optimized microbending without sacrificing cable cutoff and mode field diameter.

Primary and Secondary Coatings

The transmissivity of light through an optical fiber is highly dependent on the properties of the coatings applied to the glass fiber. As discussed above (and with reference to FIG. 4), the coatings typically include a primary coating 56 and a secondary coating 58, where the secondary coating surrounds the primary coating and the primary coating contacts the glass fiber (which includes a central core region surrounded by a cladding region). An optional tertiary layer (e.g. ink layer) surrounds and directly contacts the secondary coating.

Secondary coating 58 may be a harder material (higher Young's modulus) than primary coating 56 and is designed to protect the glass fiber from damage caused by abrasion or external forces that arise during processing, handling, and deployment of the optical fiber. Primary coating 56 may be a softer material (lower Young's modulus) than secondary coating 58 and is designed to buffer or dissipates stresses that result from forces applied to the outer surface of the secondary coating. Dissipation of stresses within the primary coating attenuates the stress and minimizes the stress that reaches the glass fiber. The primary coating is especially important in dissipating stresses that arise due to the microbends the optical fiber encounters when deployed in a cable. The microbending stresses transmitted to the glass fiber need to be minimized because microbending stresses create local perturbations in the refractive index profile of the glass fiber. The local refractive index perturbations lead to intensity losses for the light transmitted through the glass fiber. By dissipating stresses, the primary coating minimizes intensity losses caused by microbending.

Coating Examples—Preparation and Measurement Techniques

The properties of primary and secondary coatings, as disclosed herein, were determined using the measurement techniques described below:

Tensile Properties. The curable secondary coating compositions were cured and configured in the form of cured rod samples for measurement of Young's modulus, tensile strength at yield, yield strength, and elongation at yield. The cured rods were prepared by injecting the curable secondary composition into Teflon® tubing having an inner diameter of about 0.025". The rod samples were cured using a Fusion D bulb at a dose of about 2.4 J/cm$^2$ (measured over a wavelength range of 225-424 nm by a Light Bug model IL390 from International Light). After curing, the Teflon® tubing was stripped away to provide a cured rod sample of the secondary coating composition. The cured rods were allowed to condition for 18-24 hours at 23° C. and 50% relative humidity before testing. Young's modulus, tensile strength at break, yield strength, and elongation at yield were measured using a Sintech MTS Tensile Tester on defect-free rod samples with a gauge length of 51 mm, and a test speed of 250 mm/min. Tensile properties were measured according to ASTM Standard D882-97. The properties were determined as an average of at least five samples, with defective samples being excluded from the average.

In Situ Glass Transition Temperature. In situ $T_g$ measurements of primary and secondary coatings were performed on fiber tube-off samples obtained from coated fibers. The coated fibers included a glass fiber having a diameter of 125 microns, a primary coating with thickness 32.5 microns surrounding and in direct contact with the glass fiber, and a secondary coating with thickness 26.0 microns surrounding and in direct contact with the glass fiber. The glass fiber and primary coating were the same for all samples measured. The primary coating was formed from the reference primary coating composition described below. Samples with a comparative secondary coating and a secondary coating in accordance with the present disclosure were measured.

The fiber tube-off samples were obtained using the following procedure: a 0.0055" Miller stripper was clamped down approximately 1 inch from the end of the coated fiber. The one-inch region of fiber was plunged into a stream of liquid nitrogen and held in the liquid nitrogen for 3 seconds. The coated fiber was then removed from the stream of liquid nitrogen and quickly stripped to remove the coating. The stripped end of the fiber was inspected for residual coating. If residual coating remained on the glass fiber, the sample was discarded, and a new sample was prepared. The result of the stripping process was a clean glass fiber and a hollow tube of stripped coating that included intact primary and secondary coatings. The hollow tube is referred to as a "tube-off sample". The glass and primary and secondary coating diameters were measured from the end-face of the unstripped fiber.

In-situ Tg of the tube-off samples was run using a Rheometrics DMTA IV test instrument at a sample gauge length of 9 to 10 mm. The width, thickness, and length of the tube-off sample were input to the operating program of the test instrument. The tube-off sample was mounted and then cooled to approximately −85° C. Once stable, the temperature ramp was run using the following parameters:
Frequency: 1 Hz
Strain: 0.3%
Heating Rate: 2° C./min.
Final Temperature: 150° C.
Initial Static Force=20.0 g
Static>Dynamic Force by=10.0%

The in-situ Tg of a coating is defined as the maximum value of tan δ in a plot of tan δ as a function of temperature, where tan δ is defined as:

$$\tan \delta = E''/E'$$

and E" is the loss modulus, which is proportional to the loss of energy as heat in a cycle of deformation and E' is the storage or elastic modulus, which is proportional to the energy stored in a cycle of deformation.

The tube-off samples exhibited distinct maxima in the tan δ plot for the primary and secondary coatings. The maximum at lower temperature (about −50° C.) corresponded to the in-situ Tg for the primary coating and the maximum at higher temperature (above 50° C.) corresponded to the in-situ Tg for the secondary coating.

In Situ Modulus of Primary Coating. The in situ modulus was measured using the following procedure. A six-inch sample of fiber was obtained and a one-inch section from the center of the fiber was window-stripped and wiped with isopropyl alcohol. The window-stripped fiber was mounted on a sample holder/alignment stage equipped with 10 mm×5 mm rectangular aluminum tabs that were used to affix the fiber. Two tabs were oriented horizontally and positioned so that the short 5 mm sides were facing each other and separated by a 5 mm gap. The window-stripped fiber was laid horizontally on the sample holder across the tabs and over the gap separating the tabs. The coated end of one side of the window-stripped region of the fiber was positioned on one tab and extended halfway into the 5 mm gap between the tabs. The one-inch window-stripped region extended over the remaining half of the gap and across the opposing tab. After alignment, the sample was removed and a small dot of glue was applied to the half of each tab closest to the 5 mm gap. The fiber was then returned to position and the alignment stage was raised until the glue just touched the fiber. The coated end was then pulled away from the gap and through the glue such that the majority of the 5 mm gap between the tabs was occupied by the window-stripped region of the fiber. The portion of the window-stripped region remaining on the opposing tab was in contact with the glue. The very tip of the coated end was left to extend beyond the tab and into the gap between the tabs. This portion of the coated end was not embedded in the glue and was the object of the in situ modulus measurement. The glue was allowed to dry with the fiber sample in this configuration to affix the fiber to the tabs. After drying, the length of fiber fixed to each of the tabs was trimmed to 5 mm. The coated length embedded in glue, the non-embedded coated length (the portion extending into the gap between the tabs), and the primary diameter were measured.

The in situ modulus measurements were performed on a Rheometrics DMTA IV dynamic mechanical testing apparatus at a constant strain of 9e-6 1/s for a time of forty-five minutes at room temperature (21° C.). The gauge length was 15 mm. Force and the change in length were recorded and used to calculate the in situ modulus of the primary coating.

The tab-mounted fiber samples were prepared by removing any epoxy from the tabs that would interfere with the 15 mm clamping length of the testing apparatus to ensure that there was no contact of the clamps with the fiber and that the sample was secured squarely to the clamps. The instrument force was zeroed out. The tab to which the non-coated end of the fiber was affixed was then mounted to the lower clamp (measurement probe) of the testing apparatus and the tab to which the coated end of the fiber was affixed was mounted to the upper (fixed) clamp of the testing apparatus. The test was then executed, and the sample was removed once the analysis was completed.

In Situ Modulus of Secondary Coating. For secondary coatings, the in situ modulus was measured using fiber tube-off samples prepared from the fiber samples. A 0.0055 inch Miller stripper was clamped down approximately 1 inch from the end of the fiber sample. This one-inch region of fiber sample was immersed into a stream of liquid nitrogen and held for 3 seconds. The fiber sample was then removed and quickly stripped. The stripped end of the fiber sample was then inspected. If coating remained on the glass portion of the fiber sample, the tube-off sample was deemed defective and a new tube-off sample was prepared. A proper tube-off sample is one that stripped clean from the glass and consists of a hollow tube with primary and secondary coating. The glass and primary and secondary coating diameters were measured from the end-face of the un-stripped fiber sample.

The fiber tube-off samples were run using a Rheometrics DMTA IV instrument at a sample gauge length 11 mm to obtain the in situ modulus of the secondary coating. The width, thickness, and length were determined and provided as input to the operating software of the instrument. The sample was mounted and run using a time sweep program at ambient temperature (21° C.) using the following parameters:

Frequency: 1 Rad/sec
Strain: 0.3%
Total Time=120 sec.
Time Per Measurement=1 sec
Initial Static Force=15.0 g
Static>Dynamic Force by=10.0%

Once completed, the last five E' (storage modulus) data points were averaged. Each sample was run three times (fresh sample for each run) for a total of fifteen data points. The averaged value of the three runs was reported.

Puncture Resistance of Secondary Coating. Puncture resistance measurements were made on samples that included a glass fiber, a primary coating, and a secondary coating. The glass fiber had a diameter of 125 microns. The primary coating was formed from the reference primary coating composition listed in Table 7 below. Samples with various secondary coatings were prepared as described below. The thicknesses of the primary coating and secondary coating were adjusted to vary the cross-sectional area of the secondary coating as described below. The ratio of the thickness of the secondary coating to the thickness of the primary coating was maintained at about 0.8 for all samples.

The puncture resistance was measured using the technique described in the article entitled "Quantifying the Puncture Resistance of Optical Fiber Coatings", by G. Scott Glaesemann and Donald A. Clark, published in the Proceedings of the 52$^{nd}$ International Wire & Cable Symposium, pp. 237-245 (2003). A summary of the method is provided here. The method is an indentation method. A 4-centimeter length of optical fiber was placed on a 3 mm-thick glass slide. One end of the optical fiber was attached to a device that permitted rotation of the optical fiber in a controlled fashion. The optical fiber was examined in transmission under 100× magnification and rotated until the secondary coating thickness was equivalent on both sides of the glass fiber in a direction parallel to the glass slide. In this position, the thickness of the secondary coating was equal on both sides of the optical fiber in a direction parallel to the glass slide. The thickness of the secondary coating in the directions normal to the glass slide and above or below the glass fiber differed from the thickness of the secondary coating in the direction parallel to the glass slide. One of the thicknesses in the direction normal to the glass slide was greater and the other of the thicknesses in the direction normal to the glass slide was less than the thickness in the direction parallel to the glass slide. This position of the optical fiber was fixed by taping the optical fiber to the glass slide at both ends and is the position of the optical fiber used for the indentation test.

Indentation was carried out using a universal testing machine (Instron model 5500R or equivalent). An inverted microscope was placed beneath the crosshead of the testing machine. The objective of the microscope was positioned directly beneath a 75° diamond wedge indenter that was installed in the testing machine. The glass slide with taped fiber was placed on the microscope stage and positioned directly beneath the indenter such that the width of the indenter wedge was orthogonal to the direction of the optical fiber. With the optical fiber in place, the diamond wedge was lowered until it contacted the surface of the secondary coating. The diamond wedge was then driven into the secondary coating at a rate of 0.1 mm/min and the load on the secondary coating was measured. The load on the secondary coating increased as the diamond wedge was driven deeper into the secondary coating until puncture occurred, at which point a precipitous decrease in load was observed. The indentation load at which puncture was observed was recorded and is reported herein as grams of force (g) and referred to herein as "puncture load". The experiment was repeated with the optical fiber in the same orientation to obtain ten measurement points, which were averaged to determine a puncture load for the orientation. A second set of ten measurement points was taken by rotating the orientation of the optical fiber by 180°.

Macrobending Loss. Macrobending loss was determined using the mandrel wrap test specified in standard IEC 60793-1-47. In the mandrel wrap test, the fiber is wrapped one or more times around a cylindrical mandrel having a specified diameter, and the increase in attenuation at a specified wavelength due to the bending is determined. Attenuation in the mandrel wrap test is expressed in units of dB/turn, where one turn refers to one revolution of the fiber about the the mandrel. Macrobending losses at a wavelength of 850 nm and 1625 nm were determined for selected examples described below with the mandrel wrap test using mandrels with diameters of 15 mm and 30 mm.

Exemplary Embodiments of Primary and Secondary Coatings

The specific properties of primary coating 56 and secondary coating 58 may be tailored to provide sufficient robustness and microbending characteristics of the smaller diameter fibers disclosed herein. For example, primary coating 56 may have a low Young's modulus and/or a low in situ modulus. The Young's modulus of the primary coating is less than or equal to about 0.7 MPa, or less than or equal to about 0.6 MPa, or less than or equal to 0.5 about MPa, or less than or equal to about 0.4 MPa, or in the range from about 0.1 MPa to about 0.7 MPa, or in the range from about 0.3 MPa to about 0.6 MPa. The in situ modulus of the primary coating is less than or equal to about 0.50 MPa, or less than or equal to about 0.30 MPa, or less than or equal to about 0.25 MPa, or less than or equal to about 0.20 MPa, or less than or equal to about 0.15 MPa, or less than or equal to about 0.10 MPa, or in the range from about 0.05 MPa to about 0.25 MPa, or in the range from about 0.10 MPa to about 0.20 MPa.

Primary coating 56 preferably has a higher refractive index than cladding region 50 of the glass fiber in order to allow it to strip errant optical signals away from core region 48. Primary coating 56 should maintain adequate adhesion to the glass fiber during thermal and hydrolytic aging, yet still be strippable from the glass fiber for splicing purposes.

To facilitate smaller diameter optical fibers, secondary coating 58 may have a smaller thickness compared to traditional cables. However, secondary coating 58 must still maintain the required robustness and puncture resistance needed for optical fibers. As the thickness of the secondary coating decreases, its protective function diminishes. Puncture resistance is a measure of the protective function of a secondary coating. A secondary coating with a higher puncture resistance withstands greater impact without failing and provides better protection for the glass fiber.

In order to provide the required robustness and puncture resistance, secondary coating 58 may have an in situ modulus greater than about 1500 MPa, or greater than about 1600 MPa, or greater than about 1800 MPa, or greater than about 2200 MPa, or greater than about 2500 MPa, or greater than about 2600 MPa, or greater than about 2700 MPa, or in the range from about 1600 MPa to about 3000 MPa, or in the range from about 1800 MPa to about 2800 MPa, or in the range from about 2000 MPa to about 2800 MPa, or in the range from about 2400 MPa to about 2800 MPa.

Primary and secondary coatings are typically formed by applying a curable coating composition to the glass fiber as a viscous liquid and curing. The optical fiber may also include a tertiary coating that surrounds the secondary coating. The tertiary coating may include pigments, inks, or other coloring agents to mark the optical fiber for identification purposes and typically has a Young's modulus similar to the Young's modulus of the secondary coating.

Secondary coating 58 may be comprised of a trifunctional monomer. A glass transition temperature (Tg) of secondary coating 58 may be greater than about 50° C., or greater than about 60° C., or greater than about 70° C., or greater than about 80° C., or greater than about 90° C., or greater than about 100° C.

Suitable primary coatings 56 and/or secondary coatings 58 may be used so that optical fiber 46 has a puncture resistance greater than or equal to about 5 g, or greater than or equal to about 10 g, or greater than or equal to about 15 g, or greater than or equal to about 20 g, or greater than or equal to about 25 g, or greater than or equal to about 30 g, or greater than or equal to about 35 g, or greater than or equal to about 40 g, or greater than or equal to about 45 g, or greater than or equal to about 50 g, or greater than or equal to about 55 g, or greater than or equal to about 60 g.

Reduced Diameter Exemplary Embodiments

As discussed above, the optical fibers of the embodiments disclosed herein may have a glass diameter and/or a coating diameter with reduced diameters. In some embodiments, cladding region 50 may have an outer diameter of about 125 microns or less and secondary coating 58 may have an outer diameter of about 210 microns or less. Cladding region 50 may have an outer diameter of about 110 microns or less, or about 100 microns or less, or about 90 microns or less, or about 80 microns or less. Furthermore, secondary coating 58 may have an outer diameter of about 210 microns or less, or about 200 microns or less, or about 180 microns or less, or about 170 microns or less, or about 160 microns or less. It is noted that the outer diameter of cladding region 50 is the glass diameter of optical fiber 46 and that the outer diameter of secondary coating 58 may be the outer overall diameter of optical fiber 46 (when an outer tertiary ink layer is not applied).

In some exemplary examples, cladding region 50 has an outer diameter of about 125 microns and secondary coating 58 has an outer diameter of about 200 microns or less, or cladding region 50 has an outer diameter of about 125 microns and secondary coating 58 has an outer diameter of about 180 microns or less, or cladding region 50 has an outer diameter of about 125 microns and secondary coating 58 has an outer diameter of about 170 microns or less, or cladding region 50 has an outer diameter of about 125 microns and secondary coating 58 has an outer diameter between about 155 and 175 microns, or cladding region 50 has an outer diameter of about 125 microns and secondary coating 58 has an outer diameter between about 160 and 170 microns. In yet other exemplary embodiments, cladding region 50 has an outer diameter of about 110 microns or less and secondary coating 58 has an outer diameter of about 200 microns or less, or cladding region 50 has an outer diameter of about 90 microns or less and secondary coating 58 has an outer diameter of about 180 microns or less, or cladding region 50 has an outer diameter of about 90 microns and secondary coating 58 has an outer diameter between about 155 and 175 microns, or cladding region 50 has an outer diameter of about 90 microns and secondary coating 58 has an outer diameter between about 160 and 170 microns.

As discussed above, the reduced diameter optical fiber profile designs of the present disclosure provide particular advantages, such as, for example, a higher fiber count in submarine cables. However, a reduction in the cladding diameter of an optical fiber may allow some light to leak through the cladding, due to the reduced profile of the cladding. Thus, the off-set trench designs of the present disclosure have trench volumes of about 30% $\Delta$-micron$^2$ or greater to advantageously reduce "tunneling" or "radiation" losses caused by leaking of the light through the reduced diameter cladding.

Figure 7:
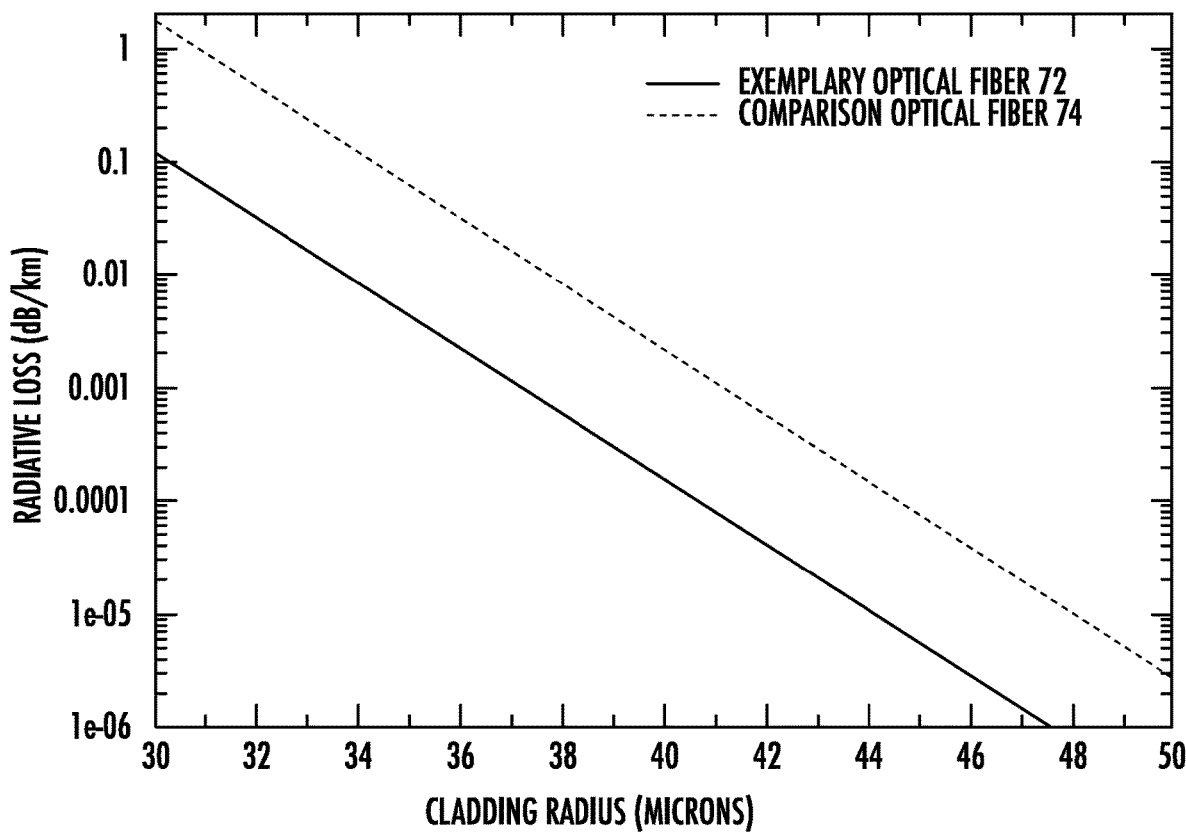
FIG. 7 depicts a plot of radiative loss vs. cladding radius for two optical fibers.

FIG. 7 shows radiation loss as a function of clad diameter for two optical fibers having a mode field diameter of 9.2 microns at 1310 nm and cable cutoff of 1430 nm. Exemplary optical fiber 72 has a trench volume of about 58% $\Delta$-micron$^2$, in accordance with the embodiments of the present disclosure, while comparison optical fiber 74 has a trench volume of only about 8% $\Delta$-micron$^2$. As shown in FIG. 7, exemplary optical fiber 72 has lower radiation loss compared with comparison optical fiber 74 over the same cladding diameter range. The larger trench volumes disclosed herein advantageously provide reduced radiation loss, thus providing a more efficient optical fiber. Additionally, off-set trench designs having trench volumes of about 30% $\Delta$micron$^2$ or greater also help in reducing microbending loss in reduced clad diameter optical fibers. Typically, optical fibers with reduced cladding diameters demonstrate increased microbending sensitivity. But, off-set trench designs having trench volumes of about 30% $\Delta$micron$^2$ or greater, as disclosed herein, provide optical fibers with reduced microbending losses.

Primary and secondary coatings may also have reduced diameters compared to the coating geometry of conventional optical fibers. The radius $r_5$ of the primary coating is less than or equal to about 85.0 microns, or less than or equal to about 80.0 microns, or less than or equal to about 75.0 microns, or less than or equal to about 70.0 microns. To facilitate decreases in the diameter of the optical fiber, it is preferable to minimize the thickness $r_5-r_4$ of the primary coating. The thickness $r_5-r_4$ of the primary coating is less than or equal to about 25.0 microns, or less than or equal to about 20.0 microns, or less than or equal to about 15.0 microns, or less than or equal to about 10.0 microns, or in the range from about 5.0 microns to about 25.0 microns, or in the range from about 8.0 microns to about 20.0 microns, or in the range from about 10.0 microns to about 17.0 microns.

The radius $r_6$ of the secondary coating is less than or equal to about 95.0 microns, or less than or equal to about 90.0 microns, or less than or equal to about 85.0 microns, or less than or equal to about 80.0 microns. It is also preferable to minimize the thickness $r_6-r_5$ of the secondary coating. The thickness $r_6-r_5$ of the secondary coating is less than or equal to about 25.0 microns, or less than or equal to about 20.0 microns, or less than or equal to about 15.0 microns, or less than or equal to about 10.0 microns, or in the range from about 5.0 microns to about 25.0 microns, or in the range from about 8.0 microns to about 20.0 microns, or in the range from about 10.0 microns to about 18.0 microns, or in the range from about 12.0 microns to about 16.0 microns.

A ratio of the thickness of the secondary coating to the thickness of the primary coating may be from about 0.50 to about 1.40, or from about 0.60 to about 1.3 or from about 0.65 to about 1.2, or from about 0.70 to about 1.10, or from about 0.75 to about 1.00, or about 0.80.

Thus, optical fibers in accordance with the embodiments of the present disclosure have reduced coating diameters, or reduced glass diameters, or both reduced coating and glass diameters from traditional optical fibers. Such helps to increase the "fiber count" within, for example, a submarine cable.

Table 7 below shows an average coating thickness for five secondary coating samples. Examples 1 and 2 compared with Examples 3, 4, and 5 show that average secondary coating thicknesses in the range of 8.0 microns to 20.0 microns produced higher tensile strength than average thicknesses below this range. The higher tensile strength exhibited by Examples 1 and 2 enable use of thinner secondary coatings on optical fibers, such as those used in submarine cables.

TABLE 7

Thickness of Secondary Coating

| Example No. | 1 | 2 | 3 | 4 | 5 |
|---|---|---|---|---|---|
| Average Secondary Coating Thickness | 10.2 microns | 10.7 microns | 6.7 microns | 6.7 microns | 6.0 microns |
| Tensile Strength (100 kpsi screening rate) | 89% | 93% | 4% | 26% | 24% |

Exemplary Primary and Secondary Coatings

Exemplary primary and secondary coatings are discussed below, along with measurements of strength and puncture resistance of the coatings.

Primary Coating—Composition. The primary coating composition includes the formulation given in Table 8 below and is typical of commercially available primary coating compositions.

TABLE 8

Reference Primary Coating Composition

| Component | Amount |
|---|---|
| Oligomeric Material | 50.0 wt % |
| SR504 | 46.5 wt % |
| NVC | 2.0 wt % |
| TPO | 1.5 wt % |
| Irganox 1035 | 1.0 pph |
| 3-Acryloxypropyl trimethoxysilane | 0.8 pph |
| Pentaerythritol tetrakis(3-mercapto propionate) | 0.032 pph |

Where the oligomeric material was prepared as described herein from H12MDI, HEA, and PPG4000 using a molar ratio n:m:p=3.5:3.0:2.0, SR504 is ethoxylated(4)nonylphenol acrylate (available from Sartomer), NVC is N-vinylcaprolactam (available from Aldrich), TPO (a photoinitiator) is (2,4,6-trimethylbenzoyl)-diphenyl phosphine oxide (available from BASF), Irganox 1035 (an antioxidant) is benzenepropanoic acid, 3,5-bis(1,1-dimethylethyl)-4-hydroxythiodi-2,1-ethanediyl ester (available from BASF), 3-acryloxypropyl trimethoxysilane is an adhesion promoter (available from Gelest), and pentaerythritol tetrakis(3-mercaptopropionate) (also known as tetrathiol, available from Aldrich) is a chain transfer agent. The concentration unit "pph" refers to an amount relative to a base composition that includes all monomers, oligomers, and photoinitiators. For example, a concentration of 1.0 pph for Irganox 1035 corresponds to 1 g Irganox 1035 per 100 g combined of oligomeric material, SR504, NVC, and TPO.

The oligomeric material was prepared by mixing H12MDI (4,4'-methylene bis(cyclohexyl isocyanate)), dibutyltin dilaurate and 2,6-di-tert-butyl-4 methylphenol at room temperature in a 500 mL flask. The 500 mL flask was equipped with a thermometer, a CaCl2 drying tube, and a stirrer. While continuously stirring the contents of the flask, PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C. to 75° C. for about 1 to 1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 cm$^{-1}$. The flask was removed from the oil bath and its contents were allowed to cool to below 65° C. Addition of supplemental HEA was conducted to insure complete quenching of isocyanate groups. The supplemental HEA was added dropwise over 2-5 minutes using an addition funnel. After addition of the supplemental HEA, the flask was returned to the oil bath and its contents were again heated to about 70° C. to 75° C. for about 1 to 1½ hours. FTIR analysis was conducted on the reaction mixture to assess the presence of isocyanate groups and the process was repeated until enough supplemental HEA was added to fully react any unreacted isocyanate groups. The reaction was deemed complete when no appreciable isocyanate stretching intensity was detected in the FTIR measurement.

Secondary Coating—Compositions. Four curable secondary coating compositions (A, SB, SC, and SD) are listed in Table 9.

TABLE 9

Secondary Coating Compositions

| Component | Composition | | | |
|---|---|---|---|---|
| | A | SB | SC | SD |
| PE210 (wt %) | 15.0 | 15.0 | 15.0 | 15.0 |
| M240 (wt %) | 72.0 | 72.0 | 72.0 | 62.0 |
| M2300 (wt %) | 10.0 | — | — | — |
| M3130 (wt %) | — | 10.0 | — | — |
| M370 (wt %) | — | — | 10.0 | 20.0 |
| TPO (wt %) | 1.5 | 1.5 | 1.5 | 1.5 |
| Irgacure 184 (wt %) | 1.5 | 1.5 | 1.5 | 1.5 |
| Irganox 1035 (pph) | 0.5 | 0.5 | 0.5 | 0.5 |
| DC-190 (pph) | 1.0 | 1.0 | 1.0 | 1.0 |

PE210 is bisphenol-A epoxy diacrylate (available from Miwon Specialty Chemical, Korea), M240 is ethoxylated (4) bisphenol-A diacrylate (available from Miwon Specialty Chemical, Korea), M2300 is ethoxylated (30) bisphenol-A diacrylate (available from Miwon Specialty Chemical, Korea), M3130 is ethoxylated (3) trimethylolpropane triacrylate (available from Miwon Specialty Chemical, Korea), TPO (a photoinitiator) is (2,4,6-trimethylbenzoyl)diphenyl phosphine oxide (available from BASF), Irgacure 184 (a photoinitiator) is 1-hydroxycyclohexyl-phenyl ketone (available from BASF), Irganox 1035 (an antioxidant) is benzenepropanoic acid, 3,5-bis(1,1-dimethylethyl)-4-hydroxythiodi-2,1-ethanediyl ester (available from BASF). DC190 (a slip agent) is silicone-ethylene oxide/propylene oxide copolymer (available from Dow Chemical). The concentration unit "pph" refers to an amount relative to a base composition that includes all monomers and photoinitiators. For example, for secondary coating composition A, a concentration of 1.0 pph for DC-190 corresponds to 1 g DC-190 per 100 g combined of PE210, M240, M2300, TPO, and Irgacure 184.

Secondary Coatings—Tensile Properties. The Young's modulus, tensile strength at yield, yield strength, and elongation at yield of secondary coatings made from secondary compositions A, SB, SC, and SD were measured using the technique described above. The results are summarized in Table 10.

TABLE 10

Tensile Properties of Secondary Coatings

| Property | Secondary Composition | | | |
|---|---|---|---|---|
| | A | SB | SC | SD |
| Young's Modulus (MPa) | 2049.08 | 2531.89 | 2652.51 | 2775.94 |
| Tensile Strength (MPa) | 86.09 | 75.56 | 82.02 | 86.08 |
| Yield Strength (MPa) | 48.21 | 61.23 | 66.37 | 70.05 |
| Elongation at Yield (%) | 4.60 | 4.53 | 4.76 | 4.87 |
| Fracture Toughness, $K_c$ ($MPa*m^{1/2}$) | 0.8580 | 0.8801 | 0.9471 | 0.9016 |

The results show that secondary coatings prepared from compositions SB, SC, and SD exhibited higher Young's modulus and higher yield strength than the secondary coating prepared from comparative composition A. Additionally, the secondary coatings prepared from compositions SB, SC, and SD exhibited higher fracture toughness than the secondary coating prepared from composition A. The higher values exhibited by composition SB, SC, and SD enable use of thinner secondary coatings on optical fibers without sacrificing performance. As discussed above, thinner secondary coatings reduce the overall diameter of the optical fiber and provide higher fiber counts in cables of a given cross-sectional area (such as submarine cables).

Exemplary Optical Fiber Embodiments

The experimental examples and principles disclosed herein indicate that sufficient microbending and puncture resistance properties can be achieved in a reduced diameter optical fiber by tailoring the coating properties of the optical fiber. More specifically, the higher modulus of the secondary coating provides sufficient puncture resistance for the reduced diameter optical profile. The above-disclosed thickness ratio of the secondary coating to the primary coating provides a reduced diameter optical fiber without sacrificing puncture resistance. Furthermore, the experimental examples and principles disclosed herein indicate that sufficient attenuation can be achieved in the reduced diameter optical fiber by providing an alkali doped core.

To examine the effect of the thickness and modulus of the primary and secondary coatings on transmission of a radial force to a glass fiber, a series of modeled examples was considered. In the model, a radial external load P was applied to the surface of the secondary coating of an optical fiber and the resulting load at the surface of the glass fiber was calculated. The glass fiber was modeled with a Young's modulus of 73.1 GPa (consistent with silica glass). The Poisson ratios $v_p$ and $v_s$ of the primary and secondary coatings were fixed at 0.48 and 0.33, respectively. A comparative sample C1 and six samples M1-M6 in accordance with the present disclosure were considered. The comparative sample included primary and secondary coatings with thicknesses and moduli consistent with optical fibers known in the art. Samples M1-M6 are examples with reduced thicknesses of the primary and secondary coatings, in accordance with the embodiments of the present disclosure. Parameters describing the configurations of the primary and secondary coatings are summarized in Table 11.

TABLE 11

Coating Properties of Modeled Optical Fibers

| | Glass | Primary Coating | | | Secondary Coating | | |
|---|---|---|---|---|---|---|---|
| Sample | Core Diameter (μm) | In Situ Modulus (MPa) | Diameter (μm) | Thickness (μm) | Young's Modulus (MPa) | Diameter (μm) | Thickness (μm) |
| C1 | 125 | 0.20 | 190 | 32.5 | 1600 | 242 | 26.0 |
| M1 | 125 | 0.14 | 167 | 21.0 | 1900 | 200 | 16.5 |
| M2 | 125 | 0.12 | 161 | 18.0 | 1900 | 190 | 14.5 |
| M3 | 125 | 0.10 | 155 | 15.0 | 2000 | 180 | 12.5 |
| M4 | 125 | 0.09 | 150 | 12.5 | 2300 | 170 | 10.0 |
| M5 | 115 | 0.12 | 145 | 15.0 | 2200 | 170 | 12.5 |
| M6 | 110 | 0.11 | 138 | 14.0 | 2200 | 160 | 11.0 |

Table 12 below summarizes the load P1 at the outer surface of the glass fiber as a fraction of load P applied to the surface of the secondary coating. The ratio P1/P is referred to herein as the load transfer parameter and corresponds to the fraction of external load P transmitted through the primary and secondary coatings to the surface of the glass fiber. The load P is a radial load and the load transfer parameter P1/P was calculated from a model based on Eqs. (9)-(11):

$$\frac{P_1}{P} = \frac{4(1-v_p)(1-v_s)}{\{A+B\}} \quad (9)$$

where $$A = \left(\frac{E_s(1+v_p)(1-2v_p)\bigl(1-(r_4/r_5)^2\bigr)\bigl(1-(r_5/r_6)^2\bigr)}{E_p(1+v_s)}\right) \quad (10)$$

and $$B = \bigl((1-2v_p(r_4/r_5)^2 + (r_4/r_5)^2)(1-2v_s(r_5/r_6)^2 + (r_5/r_6)^2)\bigr) \quad (11)$$

In Eqs. (9)-(11), $v_p$ and $v_s$ are the Poisson's ratios of the primary and secondary coatings, $r_4$ is the outer radius of the glass fiber, $r_5$ is the outer radius of the primary coating, $r_6$ is the outer radius of the secondary coating, $E_p$ is the in situ modulus of the primary coating, and $E_s$ is the Young's modulus of the secondary coating. The scaled load transfer parameter P1/P (scaled) in Table 11 corresponds to the ratio P1/P for each sample relative to comparative sample C1.

TABLE 12

Load Transfer Parameter (P1/P) at Surface of Glass Fiber

| Sample | P1/P | P1/P (scaled) |
|---|---|---|
| C1 | 0.004440 | 1.00 |
| M1 | 0.004286 | 0.97 |
| M2 | 0.004369 | 0.98 |
| M3 | 0.0042491 | 0.97 |
| M4 | 0.004240 | 0.95 |
| M5 | 0.004184 | 0.94 |
| M6 | 0.004153 | 0.94 |

The modeled examples show that despite smaller coating thicknesses, optical fibers having primary and secondary coatings as described herein exhibit a reduction in the force experienced by a glass fiber relative to a comparative optical fiber having conventional primary and secondary coatings with conventional thicknesses. The resulting reduction in overall size of the optical fibers described herein enables higher fiber count in cables of a given size (or smaller cable diameters for a given fiber count) without increasing the risk of damage to the glass fiber caused by external forces.

The scaled load transfer parameter $P_1/P$ (scaled) of the secondary coating is less than about 0.99, or less than about 0.97, or less than about 0.95. The load transfer parameter $P_1/P$ of the secondary coating is less than about 0.005, or less than 0.0045, or less than about 0.00445, or less than about 0.00444, or less than about 0.0043, or less than about 0.0042, or less than about 0.0041 or in the range from about 0.005 to about 0.0041, or in the range from about 0.0045 to about 0.0042, or in the range from about 0.00445 to about 0.00420, or in the range from about 0.00440 to about 0.004200.

Table 13 below provides additional modeled examples in accordance with embodiments of the present disclosure. Samples M7-M18 are examples with reduced thicknesses of the primary and secondary coatings. Parameters describing the configurations of the primary and secondary coatings are summarized in Table 12.

TABLE 13

Coating Properties of Modeled Optical Fibers

| | Glass | Primary Coating | | Secondary Coating | | Load Transfer Parameter (P1/P) at Surface of Glass Fiber | |
|---|---|---|---|---|---|---|---|
| Sample | Core Diameter (μm) | In Situ Modulus (MPa) | Diameter (μm) | Young's Modulus (MPa) | Diameter (μm) | P1/P | P1/P (scaled) |
| M7 | 115 | 0.18 | 162 | 1900 | 200 | 0.00430 | 0.97 |
| M8 | 115 | 0.16 | 157 | 2000 | 190 | 0.00421 | 0.95 |
| M9 | 115 | 0.14 | 151 | 2000 | 180 | 0.00436 | 0.98 |

TABLE 13-continued

Coating Properties of Modeled Optical Fibers

| Sample | Glass Core Diameter (μm) | Primary Coating In Situ Modulus (MPa) | Primary Coating Diameter (μm) | Secondary Coating Young's Modulus (MPa) | Secondary Coating Diameter (μm) | Load Transfer Parameter (P1/P) at Surface of Glass Fiber P1/P | P1/P (scaled) |
|---|---|---|---|---|---|---|---|
| M10 | 115 | 0.11 | 146 | 2000 | 170 | 0.00428 | 0.96 |
| M11 | 110 | 0.2 | 160 | 1900 | 200 | 0.00429 | 0.97 |
| M12 | 110 | 0.19 | 154 | 2000 | 190 | 0.00437 | 0.99 |
| M13 | 110 | 0.16 | 149 | 2000 | 180 | 0.00432 | 0.97 |
| M14 | 110 | 0.13 | 143 | 2000 | 170 | 0.00422 | 0.95 |
| M15 | 105 | 0.22 | 158 | 1900 | 200 | 0.00427 | 0.96 |
| M16 | 105 | 0.20 | 152 | 2000 | 190 | 0.00411 | 0.93 |
| M17 | 105 | 0.18 | 147 | 2000 | 180 | 0.00427 | 0.96 |
| M18 | 105 | 0.16 | 141 | 2000 | 170 | 0.00445 | 1.00 |

Fiber Draw Process

The optical fibers disclosed herein may be formed from a continuous optical fiber manufacturing process, during which a glass fiber is drawn from a heated preform and sized to a target diameter. The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

In some processes, the coating system further applies a tertiary coating composition to the secondary coating and cures the tertiary coating composition to form a solidified tertiary coating. Typically, the tertiary coating is an ink layer used to mark the fiber for identification purposes and has a composition that includes a pigment and is otherwise similar to the secondary coating. The tertiary coating is applied to the secondary coating and cured. The secondary coating has typically been cured at the time of application of the tertiary coating. The primary, secondary, and tertiary coating compositions can be applied and cured in a common continuous manufacturing process. Alternatively, the primary and secondary coating compositions are applied and cured in a common continuous manufacturing process, the coated fiber is collected, and the tertiary coating composition is applied and cured in a separate offline process to form the tertiary coating.

Multicore Optical Fibers

The optical fibers disclosed herein may be used in a multicore optical fiber design. With the optical fibers of the present disclosure, such a multicore optical fiber design can be achieved that has a maximum number of cores in a smaller profile cable, while maintaining low cross talk between the fibers, low tunneling loss from corner fibers to the edge, and good bending performance. For example, a multicore optical fiber may include the small profile fibers disclosed herein, each having a halogen and/or an alkali metal doped core and an offset trench design as discussed above. Thus, the above-discussed single-core optical fibers may be used in a multicore optical fiber to provide the same mode field diameter, effective area, and attenuation as discussed above.

Figure 8A:
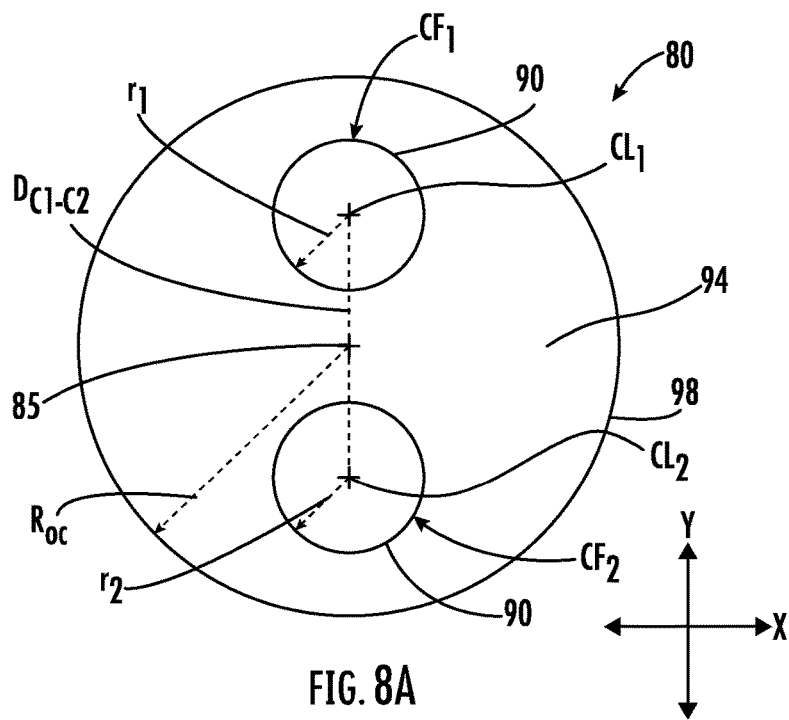
FIG. 8A depicts a schematic view of a multicore optical fiber according to embodiments of the present disclosure.

FIG. 8A shows a cross-sectional view of an exemplary multicore optical fiber 80 with a circular profile. As shown in FIG. 8A, multicore optical fiber 80 includes a central fiber axis 85 (the centerline of multicore optical fiber 80), a plurality of cores 90, and a cladding matrix 94 that forms a common cladding 98. Cores 90 are disposed within cladding matrix 94, with each core 90 forming a core fiber $CF_1$, $CF_2$ that generally extends through a length of multicore optical fiber 80 parallel to central fiber axis 85.

Each core 90 includes a central axis or centerline $CL_1$ and $CL_2$ and an outer radius $r_1$ and $r_2$, respectively. It is noted that outer radius $r_1$, $r_2$ are similar to radius $r_1$, as disclosed above with reference to FIG. 5. As shown in FIG. 8A, a position of each of the centerlines $CL_1$ and $CL_2$ within multicore optical fiber 80 can be defined using Cartesian coordinates with central fiber axis 85 defining the origin (0, 0) of an x-y coordinate system coincident with the coordinate system defined by the radial coordinate R. The position of centerline $CL_1$ can be defined as $(x_1, y_1)$ and the position of centerline $CL_2$ can be defined as $(x_2, y_2)$. A distance $D_{c1}$-$c_2$ between centerlines $CL_1$ and $CL_2$ can then be defined as $\sqrt{[(x_2-x_1)^2+(y_2-y_1)^2]}$. Thus, for a given core 90 having a centerline $CL_i$ and an adjacent core 90 having a centerline $CL_j$, a distance $D_{Ci-Cj}$ is defined as $\sqrt{[(x_j-x_i)^2+(y_j-y_i)^2]}$, as also discussed further below.

Cores 90 may be similar to and comprise the same materials and properties as core region 48 (as discussed above with reference to the single-core optical fibers), and cladding matrix 94 may be similar to and comprise the same materials and properties as cladding region 50 (as also discussed above with reference to the single-core optical fibers). Thus, each core 90 of multicore optical fiber 80 may be surrounded by a cladding region with an off-set trench design, as discussed above. According to embodiments of the present disclosure, a multicore optical fiber includes a first core, a first inner cladding surrounding the first core, a second core, a second inner cladding surrounding the second core, and a common cladding surrounding the first core and the second core. Additionally, a primary coating, a secondary coating, and optionally a tertiary coating may be disposed on cladding matrix 94, as also discussed above.

Figure 8B:
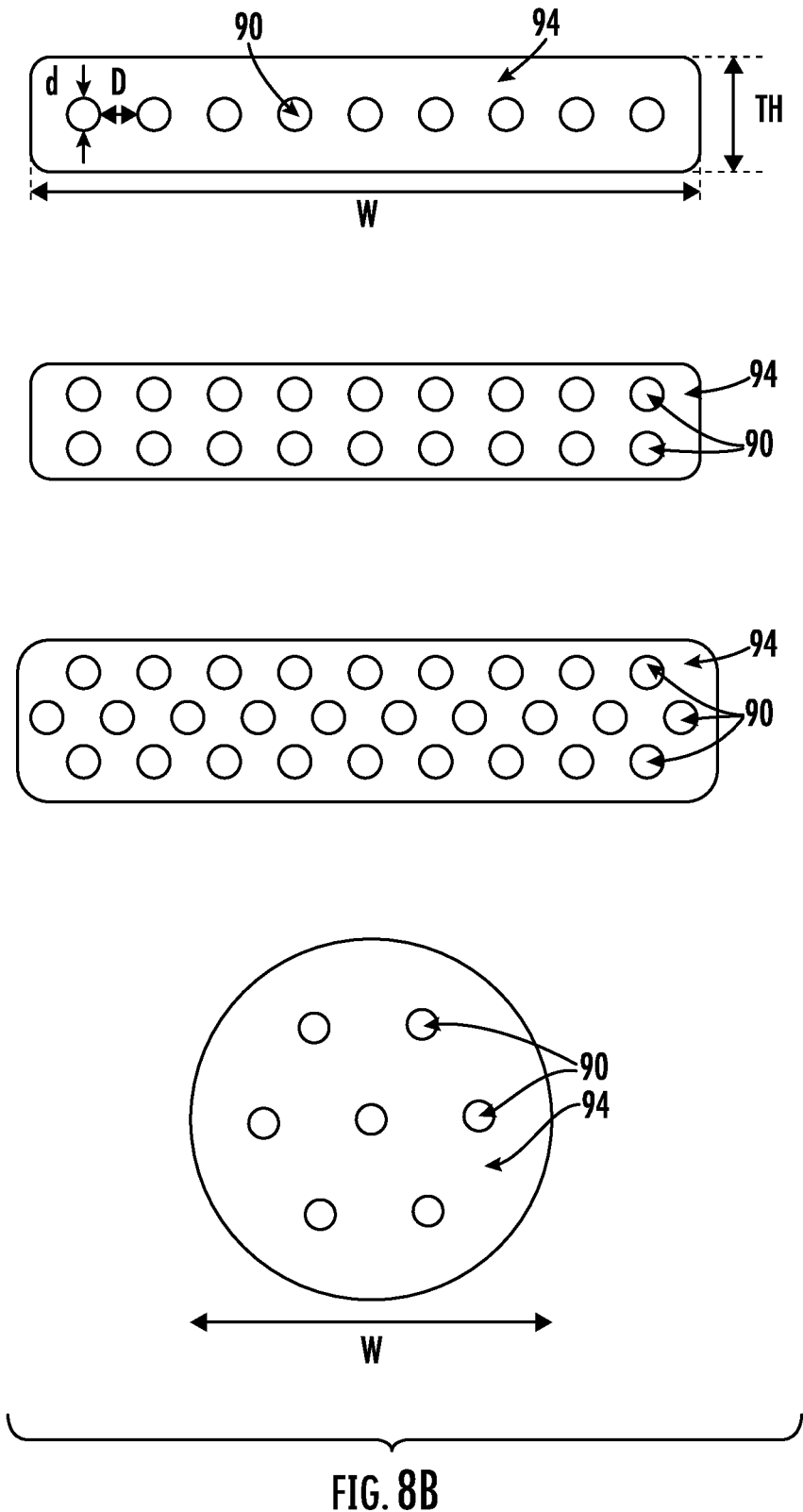
FIG. 8B depicts schematic views of multicore optical fibers according to embodiments of the present disclosure.

Although FIG. 8A only shows two cores 90, multicore optical fiber 80 may comprise more than two cores, as also discussed below. Furthermore, multicore optical fiber 80 may comprise a circular cross-sectional profile (as shown in FIG. 8A) or a rectangular ribbon cross-sectional profile. FIG. 8B shows additional exemplary embodiments of multicore optical fiber 80.

Figure 9:
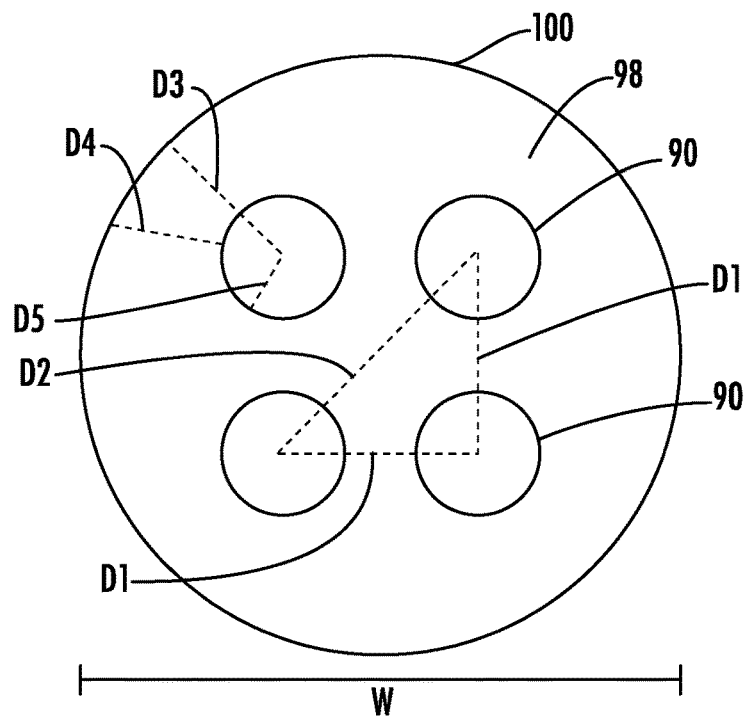
FIG. 9 depicts a schematic view of a multicore optical fiber according to embodiments of the present disclosure.

Multicore optical fiber 80 may comprise any number of cores 90 in any configuration as is known in the art. For example, the total number of cores 90 may be from 2 to 20, 2 to 18, 2 to 16, 2 to 12, 2 to 10, 2 to 8, 2 to 6, 2 to 4, 2 to 3, 4 to 20, 4 to 18, 4 to 16, 4 to 12, 4 to 10, 4 to 8, 4 to 6, 6 to 20, 6 to 18, 6 to 16, 6 to 12, 6 to 10, 6 to 8, 8 to 20, 8 to 18, 8 to 16, 8 to 12, 8 to 10, 10 to 20, 10 to 18, 10 to 16, 10 to 12, 12 to 20, 12 to 18, or 12 to 16. For example, the total number of cores 90 can be 2, 3, 4, 5, 6, 7, 8, 9, 10, 11, 12, 13, 14, 15, 16, 17, 18, 19, 20, or any total number of cores between any of these values. The total number of cores 90 can be even or odd and can be arranged in any pattern within cladding matrix 94, non-limiting examples of which include a square pattern, a rectangular pattern, a circular pattern, and a hexagonal lattice pattern. FIG. 9, for example, shows a multicore optical fiber comprising 4 cores arranged in a square pattern.

Figure 8C:
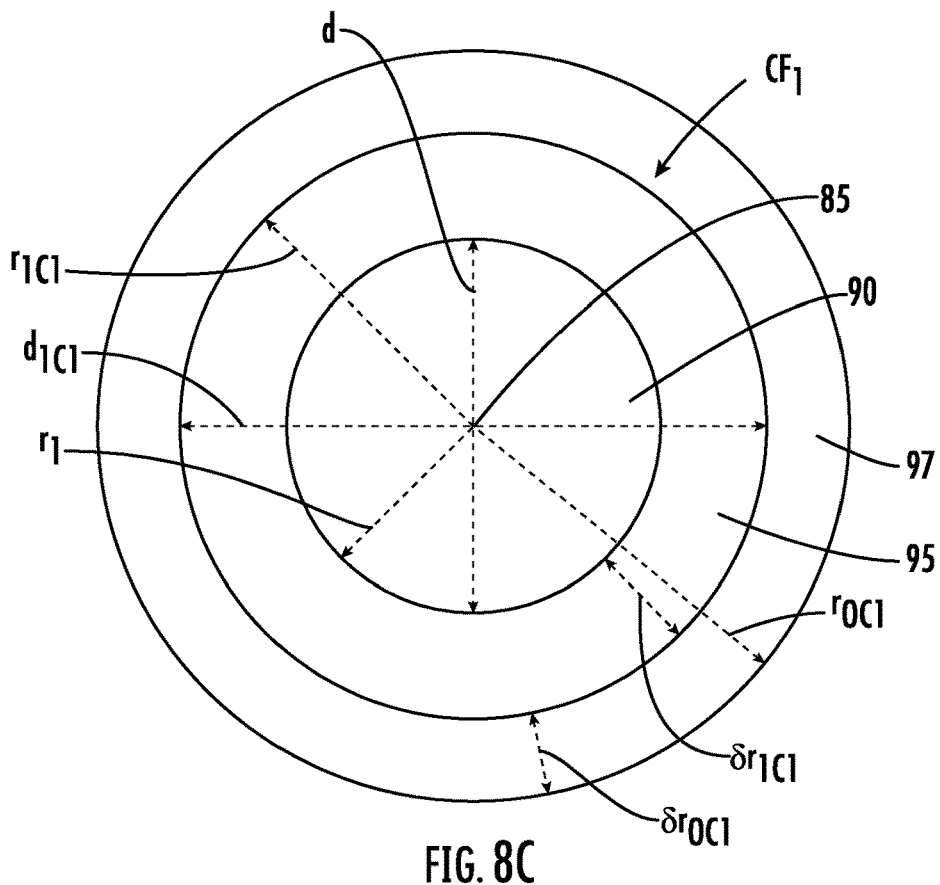
FIG. 8C depicts a schematic view of a multicore optical fiber according to embodiments of the present disclosure.

As shown in FIG. 8C, one or more of the plurality of cores 90 of multicore optical fiber 80 is surrounded by an inner cladding 95 and an outer cladding 97, such that outer cladding 97 surrounds inner cladding 95 between inner cladding 95 and common cladding 98. Each inner cladding 95 has an outer radius no and an inner radius that corresponds to the outer radius $r_1$ of core 90. Inner cladding 95 has a width $\delta r_{IC1}$ defined by the outer radius $r_1$ of core 90 and the outer radius no of inner cladding 95. Core 90 can have a diameter d corresponding to $2*r_1$, and inner cladding 95 can have a diameter dice corresponding to $2*r_{IC1}$. Each outer cladding 97 has an outer radius $r_{OC1}$ and an inner radius that corresponds to the outer radius $r_{IC1}$ of inner cladding 95. Outer cladding 97 has a width $\delta r_{OC1}$ defined by the outer radius $r_{IC1}$ of inner cladding 95 and the outer radius $\delta r_{OC1}$ of outer cladding 97. It is noted that outer radius $r_{IC1}$ of inner cladding 95 is similar to radius $r_2$ and that outer radius $r_{OC1}$ of outer cladding 97 is similar to radius $r_3$, as discussed above with reference to FIG. 5. Common cladding 98 has an outer radius $R_{oc}$, as shown in FIG. 8A.

Inner cladding 95 may be similar to and comprise the same materials and properties as inner cladding region 51 (as discussed above with reference to the single-core optical fibers), outer cladding 97 may be similar to and comprise the same materials and properties as depressed-index cladding region 53 (as discussed above with reference to the single-core optical fibers), and common cladding 98 may be similar to and comprise the same materials and properties as outer cladding region 55 (as discussed above with reference to the single-core optical fibers). Thus, for example, outer cladding 97 may form a trench region, similar to depressed-index cladding region 53.

With reference to FIGS. 8A-8C, cores 90 each have a diameter "d" ($r_1 \times 2$ or $r_2 \times 2$) in a range from about 4 microns to about 20 microns, or about 5 microns to about 18 microns, or about 6 microns to about 16 microns, or from about 7 microns to about 14 microns, or from about 8 microns to about 12 microns, or from about 9 microns to about 12 microns. The diameter d of each core 90 may be the same or different from one or more other cores 90 in multicore optical fiber 80. The spacing between each core 90 D may be constant between each core 90 and may be about 20 microns or greater, or about 25 microns or greater, or about 30 microns or greater, or about 35 microns or greater. Additionally or alternatively, the spacing D may be about 50 microns or less, or about 45 microns or less, or about 40 microns or less, or about 35 microns or less. In some embodiments, the spacing D is in the range from about 20 microns to about 40 microns, or about 25 microns to about 35 microns, or about 35 microns. In yet other embodiments, the spacing between two or more cores 90 may be different from the spacing between two or more other cores 90. The spacing between cores 90 should be sufficient to reduce cross-talk between the cores, as discussed further below.

When in ribbon form, multicore optical fiber 80 has a cross-sectional width W and a thickness TH, as shown in FIG. 8B. Cores 90 can be arranged in one or more rows along the thickness TH and in one or columns extending along the width W. The width W may be about 0.5 mm to about 3 mm, or about 1 mm to about 2.5 mm, or about 1 mm to about 2 mm. The thickness may about 0.1 to about 0.5 mm, or about 0.2 to 0.4 mm. In one embodiment, multicore optical fiber 80 has a rectangular ribbon cross-sectional profile, comprises 8 cores, has a width W of about 2 mm, and a thickness TH of about 0.3 mm.

In the circular cross-sectional design, the width W of cladding matrix 94 is the diameter of common cladding 98 ($R_{oc} \times 2$) and may be about 200 microns or less, or about 150 microns or less, or about 125 microns or less, or about 80 microns or greater, or in the range of about 80 microns to about 125 microns, or about 120 microns to about 130 microns, or about 125 microns. In yet other embodiments, the diameter of common cladding 98 may be about 140 microns or greater, or about 150 microns or greater, or about 160 microns or greater, or about 170 microns or greater, or about 180 microns or greater, or about 190 microns or greater. Additionally or alternatively, the diameter of common cladding 98 may be about 200 microns or less, or about 190 microns or less, or about 180 microns or less, or about 170 microns or less, or about 160 microns or less, or about 150 microns or less, or about 140 microns or less. In some examples, the diameter of common cladding 98 is in a range from about 120 microns to about 140 microns.

FIG. 9 shows an exemplary multicore optical fiber 100 with 4 cores 90 arranged in a square design. As shown in FIG. 9, a distance D1 between a centerline ($CL_1$) of a first core and a centerline ($CL_2$) of an adjacent core is less than about 50 microns, as measured using a Cartesian coordinate system, as discussed above. For example, a distance D1 between adjacent cores can be greater than about 20 microns, greater than about 25 microns, greater than about 28 microns, greater than about 30 microns, greater than about 35 microns, or greater than about 40 microns. Additionally or alternatively, distance D1 can be less than about 45 microns, less than about 40 microns, or less than about 35 microns. For example, distance D1 can be from about 20 microns to about 50 microns, about 20 microns to about 45 microns, about 20 microns to about 30 microns, about 28 microns to about 50 microns, about 28 microns to about 40 microns, about 28 microns to about 30 microns, about 30 microns to about 50 microns, about 30 microns to about 40 microns, or about 40 microns to about 45 microns. Distance D1 between adjacent cores 90 can be the same or different for each of the cores.

The distance D2 between two cores separated by a maximum distance in, for example, a 4×4 square pattern, can be about 20 microns or greater, about 25 microns or greater, about 30 microns or greater, about 35 microns or greater, or about 40 microns or greater. Additionally or alternatively, distance D2 can be about 50 microns or less, about 45 microns or less, about 40 microns or less, about 35 microns or less, or about 30 microns or less.

As also shown in FIG. 9, a distance D3 between a centerline of a core 90 and an outer radius of common cladding 98 can be about 40 microns or less, about 35 microns or less, about 30 microns or less, about 25 microns or less, or about 20 microns or less. Additionally or alternatively, distance D3 can be about 25 microns or greater, about 30 microns or greater, about 35 microns or greater, about 35 microns or greater, or about 40 microns or greater. In some examples, distance D3 is in a range from about 25 microns to about 40 microns, or from about 30 microns to about 35 microns. It is also contemplated that distance D3 may be the same or different for each core 90.

A distance D4 between an outer radius of a core 90 and an outer radius of common cladding 98 can be about 25 microns or less, about 20 microns or less, about 18 microns or less, about 16 microns or less, about 14 microns or less, about 13 microns or less, about 12 microns or less, about 10 microns or less, about 8 microns or less, or about 6 microns or less. Additionally or alternatively, distance D4 can be about 8 microns or greater, about 10 microns or greater, about 13 microns or greater, about 16 microns or greater, or about 18 microns or greater. In some examples, distance D4 is in a range from about 10 microns to about 20 µm, or from about 12 microns to about 16 microns. It is also contemplated that distance D4 may be the same or different for each core 90.

Furthermore, distance D5, as shown in FIG. 9, may be a radius (e.g., $r_1$, $r_2$) of each core 90. Distance D5 may be in range from about 2 microns to about 30 microns, or from about 2.5 microns to about 22.5 microns, or from about 5 microns to about 20 microns, or from about 7 microns to about 14 microns, or from about 8 microns to about 12 microns, or from about 9 microns to about 11 microns. For example, D5 may be about 9 microns, about 10 microns, about 10.5 microns, about 11 microns, about 11.5 microns, about 12 microns, about 12.5 microns, about 13 microns, about 14 microns, about 15 microns, about 15.5 microns, about 16 microns, about 16.5 microns, about 17 microns, about 17.5 microns, or about 18 microns. It is also contemplated that distance D5 may be the same or different for each core 90.

In one embodiment, the exemplary multicore optical fiber 100 comprises 4 core regions in a 4×4 square design such that that the width W of the fiber is about 125 microns, distance D1 is about 45 microns, distance D2 is about 63.6 microns, distance D3 is about 30.7 microns, distance D4 is about 13 microns, and distance D5 is about 17.6 microns.

As discussed above, cores 90 have reduced crosstalk to ensure good system performance. Crosstalk depends on the distance between the cores and the fiber length. The average crosstalk between the cores may be computed from Eq. (12)

$$X = 2\kappa^2 L L_c \quad (12)$$

where k is the coupling coefficient, L is the fiber length, and $L_c$ is the correlation length that depends on the fiber uniformity and deployment conditions.

In some embodiments, the average crosstalk between adjacent cores 90 is equal to or less than about −20 dB, or equal to or less than about −30 db, or equal to or less than about −35 dB, or less than about −40 dB, or less than about −45 dB, or less than about −50 dB, or equal to or less than about −55 dB, or equal to or less than about −60 dB, as measured for a 100 km length of the multicore optical fiber operating at 1550 nm.

Figure 10:
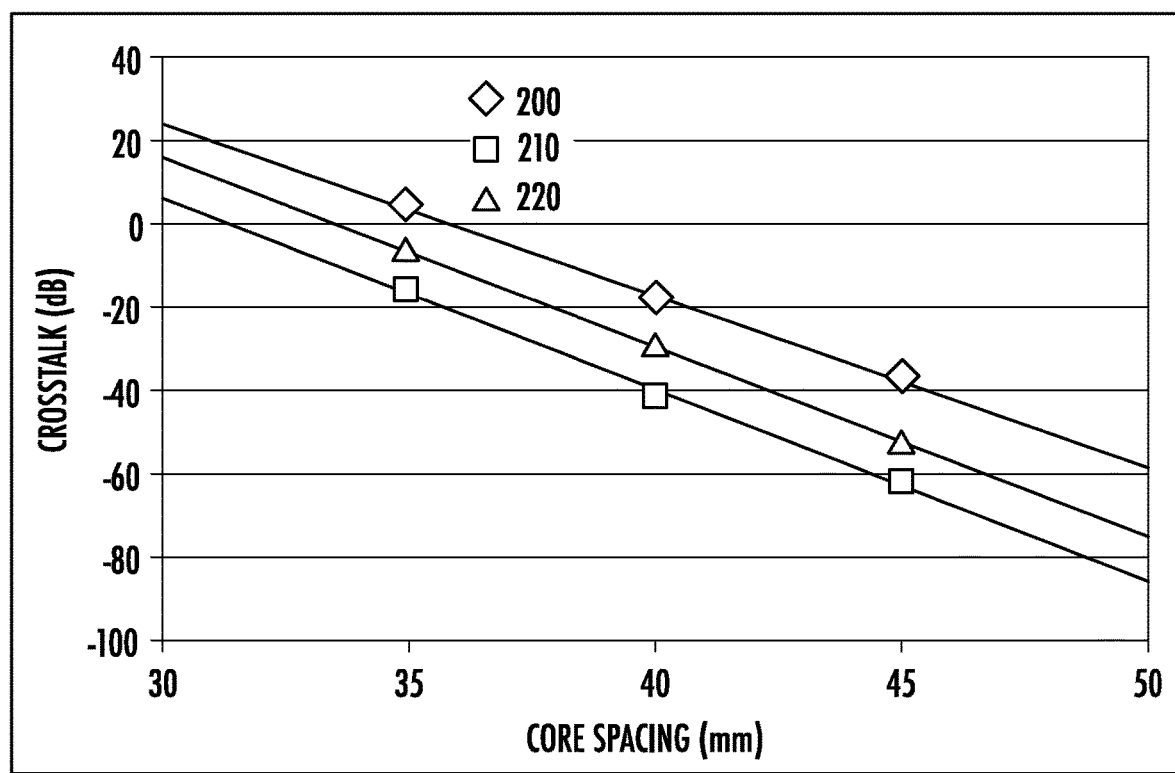
FIG. 10 depicts a plot of crosstalk vs. core spacing for three multicore optical fibers.

FIG. 10 shows a plot of crosstalk and spacing between adjacent cores 90 in multicore optical fiber designs along a fiber length of 100 km. Trace 200 represents a multicore optical fiber design with a step index profile and an effective area of 80 micron$^2$, trace 210 represents a multicore optical fiber design with an offset trench design (as disclosed herein) and with an effective area of 80 micron$^2$, and trace 220 represents a multicore optical fiber design with an offset trench design (as disclosed herein) and an effective area of 100 micron$^2$. As shown in FIG. 10, trace 220 has lower crosstalk than trace 200 as the spacing between the cores increases. Furthermore, trace 210 has lower crosstalk than trace 220 as the spacing between the cores increases. Thus, FIG. 10 shows that a multicore design with cores each having an effective area of 80 micron$^2$ and an offset trench design advantageously provides lower crosstalk than cores with an effective area of 100 micron$^2$ or with fibers having a step index profile.

In the multicore optical fiber designs disclosed herein, cores 90 may have an attenuation at 1550 nm of less than or equal to 0.18 dB/km, or less than or equal to 0.175 dB/km, or less than or equal to 0.170 dB/km, or less than or equal to 0.165 dB/km, or less than or equal to 0.160 dB/km, or less than or equal to 0.155 dB/km, or less than or equal to 0.150 dB/km, as also discussed above. Each core 90 may have the same or different attenuation.

Cores 90 of the multicore optical fibers disclosed herein may have a theoretical cutoff wavelength of less than about 1500 nm, less than about 1400 nm, less than about 1300 nm, less than about 1260 nm, or less than about 1200 nm. For example, the theoretical cutoff wavelength can be from about 1300 nm to about 1500 nm or about 1300 nm to about 1400 nm. For example, the theoretical cutoff wavelength can be about 1300 nm, about 1310 nm, about 1320 nm, about 1329 nm, about 1330 nm, about 1340 nm, about 1350 nm, about 1360 nm, about 1370 nm, about 1380 nm, about 1400 nm, about 1500 nm, or any theoretical cutoff wavelength between these values. Each core 90 may have the same or different theoretical cutoff wavelength.

According to one aspect, a cable cutoff wavelength of cores 90 is less than about 1500 nm, less than about 1400 nm, less than about 1300 nm, less than about 1260 nm, or less than about 1200 nm. For example, the cable cutoff wavelength can be from about 1200 nm to about 1500 nm, about 1200 nm to about 1400 nm, about 1200 nm to about 1300 nm, about 1300 nm to about 1500 nm, about 1300 nm to about 1400 nm, or about 1400 nm to about 1500 nm. For example, the cable cutoff wavelength can be about 1200 nm, about 1209 nm, about 1210 nm, about 1220 nm, about 1230 nm, about 1240 nm, about 1250 nm, about 1260 nm, about 1300 nm, about 1310 nm, about 1350 nm, about 1400 nm, about 1410 nm, about 1420 nm, about 1430 nm, about 1440 nm, about 1450 nm, about 1460 nm, about 1500 nm, or any cable cutoff wavelength between these values. Each core region 90 may have the same or different cable cutoff wavelength.

According to one aspect, cores 90 can have a zero dispersion wavelength from about 1280 nm to about 1340 nm. For example, the zero dispersion wavelength can be from about 1290 nm to about 1330 nm, about 1295 nm to about 1325 nm, about 1300 nm to about 1320 nm, or from about 1305 nm to about 1315 nm. For example, the zero dispersion wavelength can be about 1280 nm, about 1285 nm, about 1289 nm, about 1290 nm, about 1300 nm, about 1301 nm, about 1305 nm, about 1306 nm, about 1310 nm, about 1315 nm, or about 1320 nm, or any zero dispersion wavelength between these values. Each core 90 may have the same or different zero dispersion wavelength.

According to an aspect of the present disclosure, cores 90 can have a dispersion having an absolute value at 1310 nm of less than 3 ps/nm/km and a dispersion slope at 1310 nm of less than 0.1 ps/nm$^2$/km. Each core 90 may have the same or different dispersion and dispersion slope at 1310 nm. For example, the absolute value of the dispersion at 1310 nm can be from about 0.3 ps/nm/km to about 3 ps/nm/km, about 0.3 ps/nm/km to about 2.5 ps/nm/km, about 0.3 ps/nm/km to about 2.25 ps/nm/km, about 0.3 ps/nm/km to about 2 ps/nm/km, about 0.3 ps/nm/km to about 1.75 ps/nm/km, about 0.3 ps/nm/km to about 1.5 ps/nm/km, or about 0.3 ps/nm/km to about 1 ps/nm/km. For example, the absolute value of the dispersion at 1310 can be about 0.3 ps/nm/km, about 0.35 ps/nm/km, about 0.4 ps/nm/km, about 0.5 ps/nm/km, about 0.75 ps/nm/km, about 1 ps/nm/km, about 1.25 ps/nm/km, about 1.5 ps/nm/km, about 1.75 ps/nm/km, about 2 ps/nm/km, about 2.25 ps/nm/km, about 2.5 ps/nm/km, about 2.75 ps/nm/km, about 3 ps/nm/km, or any value between these values. In one example, the dispersion slope at 1310 nm can be about 0.075 ps/nm$^2$/km to about 0.1 ps/nm$^2$/km, about 0.08 ps/nm$^2$/km to about 0.1 ps/nm$^2$/km, about 0.085 ps/nm$^2$/km to about 0.1 ps/nm$^2$/km, about 0.09 ps/nm$^2$/km to about 0.1 ps/nm$^2$/km, about 0.075 ps/nm$^2$/km to about 0.09 ps/nm$^2$/km, about 0.08 ps/nm$^2$/km to about 0.09 ps/nm$^2$/km, or about 0.085 ps/nm$^2$/km to about 0.09 ps/nm$^2$/km. For example, the dispersion slope at 1310 nm can be about 0.075 ps/nm$^2$/km, about 0.08 ps/nm$^2$/km, about 0.085 ps/nm$^2$/km, about 0.086 ps/nm$^2$/km, about 0.087 ps/nm$^2$/km, about 0.088 ps/nm$^2$/km, about 0.089 ps/nm$^2$/km, about 0.09 ps/nm$^2$/km, about 0.01 ps/nm$^2$/km, or any value between these values.

According to an aspect of the present disclosure, cores 90 can have a dispersion at 1550 nm of less than 22 ps/nm/km and a dispersion slope at 1550 nm of less than 0.1 ps/nm$^2$/km. Each core 90 may have the same or different dispersion and dispersion slope at 1550 nm. For example, the dispersion at 1550 nm can be from about 10 ps/nm/km to about 22 ps/nm/km, about 10 ps/nm/km to about 22 ps/nm/km, about 10 ps/nm/km to about 20 ps/nm/km, about 10 ps/nm/km to about 15 ps/nm/km, about 15 ps/nm/km to about 22 ps/nm/km, or about 15 ps/nm/km to about 20 ps/nm/km. For example, the dispersion at 1550 can be about 10 ps/nm/km, about 15 ps/nm/km, about 16 ps/nm/km, about 17 ps/nm/km, about 17.5 ps/nm/km, about 18 ps/nm/km, about 19 ps/nm/km, about 19.5 ps/nm/km, about 19.6 ps/nm/km, about 20 ps/nm/km, about 20.1 ps/nm/km, about 22 ps/nm/km, or any value between these values. In one example, the dispersion slope at 1550 nm can be about 0.04 ps/nm$^2$/km to about 0.1 ps/nm$^2$/km, about 0.05 ps/nm$^2$/km to about 0.1 ps/nm$^2$/km, about 0.055 ps/nm$^2$/km to about 0.1 ps/nm$^2$/km, about 0.06 ps/nm$^2$/km to about 0.1 ps/nm$^2$/km, about 0.08 ps/nm$^2$/km to about 0.1 ps/nm$^2$/km, about 0.04 ps/nm$^2$/km to about 0.08 ps/nm$^2$/km, about 0.05 ps/nm$^2$/km to about 0.08 ps/nm$^2$/km, about 0.055 ps/nm$^2$/km to about 0.08 ps/nm$^2$/km, about 0.06 ps/nm$^2$/km to about 0.08 ps/nm$^2$/km, about 0.04 ps/nm$^2$/km to about 0.06 ps/nm$^2$/km, about 0.05 ps/nm$^2$/km to about 0.06 ps/nm$^2$/km, or about 0.055 ps/nm$^2$/km to about 0.06 ps/nm$^2$/km. For example, the dispersion slope at 1550 nm can be about 0.04 ps/nm$^2$/km, about 0.05 ps/nm$^2$/km, about 0.055 ps/nm$^2$/km, about 0.057 ps/nm$^2$/km, about 0.058 ps/nm$^2$/km, about 0.059 ps/nm$^2$/km, about 0.06 ps/nm$^2$/km, about 0.061 ps/nm$^2$/km, about 0.07 ps/nm$^2$/km, about 0.08 ps/nm$^2$/km, or any value between these values.

According to one aspect, the bending loss of each core 90 in the multicore optical fibers disclosed herein at 1550 nm, as determined by the mandrel wrap test using a mandrel having a diameter of 10 mm, may be less than about 3 dB/turn, less than about 2.5 dB/turn, less than about 2 dB/turn, less than about 1.5 dB/turn, or less than about 1 dB/turn. For example, the bend loss can be from about 0.5 dB/turn to about 3 dB/turn, about 0.5 dB/turn to about 2.5 dB/turn, about 0.5 dB/turn to about 2 dB/turn, about 0.5 dB/turn to about 1.5 dB/turn, about 0.5 dB/turn to about 1 dB/turn, about 1 dB/turn to about 3 dB/turn, about 1 dB/turn to about 2.5 dB/turn, about 1 dB/turn to about 2 dB/turn, about 1 dB/turn to about 1.5 dB/turn, about 1.5 dB/turn to about 3 dB/turn, about 1.5 dB/turn to about 2.5 dB/turn, about 1.5 dB/turn to about 2 dB/turn, about 2 dB/turn to about 3 dB/turn, or about 2 dB/turn to about 2.5 dB/turn using a mandrel having a diameter of 10 mm. For example, the bend loss can be about 0.5 dB/turn, about 0.75 dB/turn, about 0.9 dB/turn, about 1 dB/turn, about 1.5 dB/turn, about 2 dB/turn, about 2.5 dB/turn, about 3 dB/turn, or any value between these values, using a mandrel having a diameter of 10 mm.

According to one aspect, the bending loss of each core 90 in the multicore optical fibers disclosed herein at 1550 nm, as determined by the mandrel wrap test using a mandrel having a diameter of 15 mm, may be less than about 1 dB/turn, less than about 0.75 dB/turn, less than about 0.5 dB/turn, or less than about 0.3 dB/turn. For example, the bend loss can be from about 0.1 dB/turn to about 1 dB/turn, about 0.1 dB/turn to about 0.75 dB/turn, about 0.1 dB/turn to about 0.5 dB/turn, about 0.2 dB/turn to about 1 dB/turn, about 0.2 dB/turn to about 0.75 dB/turn, about 0.2 dB/turn to about 0.5 dB/turn, about 0.3 dB/turn to about 1 dB/turn, about 0.3 dB/turn to about 0.75 dB/turn, or about 0.3 dB/turn to about 0.5 dB/turn, using a mandrel having a diameter of 15 mm. For example, the bend loss can be about 0.2 dB/turn, about 0.23 dB/turn, about 0.25 dB/turn, about 0.3 dB/turn, about 0.5 dB/turn, about 0.6 dB/turn, about 0.75 dB/turn, about 1 dB/turn, or any value between these values, using a mandrel having a diameter of 15 mm.

According to one aspect, the bending loss of each core 90 in the multicore optical fibers disclosed herein at 1550 nm, as determined by the mandrel wrap test using a mandrel having a diameter of 20 mm, may be less than about 3 dB/turn, less than about 2 dB/turn, less than about 1 dB/turn, less than about 0.5 dB/turn, less than about 0.3 dB/turn, or less than about 0.2 dB/turn. For example, the bend loss can be from about 0.1 dB/turn to about 3 dB/turn, about 0.1 dB/turn to about 2.5 dB/turn, about 0.1 dB/turn to about 2 dB/turn, about 0.2 dB/turn to about 3 dB/turn, about 0.2 dB/turn to about 2.5 dB/turn, about 0.2 dB/turn to about 2 dB/turn, about 0.3 dB/turn to about 3 dB/turn, about 0.3 dB/turn to about 2.5 dB/turn, or about 0.3 dB/turn to about 2 dB/turn, about 0.1 dB/turn to about 1 dB/turn, about 0.1 dB/turn to about 0.75 dB/turn, about 0.1 dB/turn to about 0.5 dB/turn, 0.5 dB/turn to about 3 dB/turn, about 0.5 dB/turn to about 2.5 dB/turn, about 0.5 dB/turn to about 2 dB/turn, 1 dB/turn to about 3 dB/turn, about 1 dB/turn to about 2.5 dB/turn, or about 1 dB/turn to about 2 dB/turn, using a mandrel having a diameter of 20 mm. For example, the bend loss can be about 0.2 dB/turn, about 0.23 dB/turn, about 0.25 dB/turn, about 0.3 dB/turn, about 0.5 dB/turn, about 0.6 dB/turn, about 0.75 dB/turn, about 0.8 dB/turn, about 0.9 dB/turn, about 1 dB/turn, about 2 dB/turn, about 2.1 dB/turn, about 2.5 dB/turn, about 3 dB/turn, or any value between these values, using a mandrel having a diameter of 20 mm.

According to one aspect, the bending loss of each core 90 in the multicore optical fibers disclosed herein at 1550 nm, as determined by the mandrel wrap test using a mandrel having a diameter of 30 mm, may be less than about 1 dB/turn, less than about 0.5 dB/turn, less than about 0.25 dB/turn, less than about 0.1 dB/turn, less than about 0.05 dB/turn, less than about 0.01 dB/turn, or less than about 0.005 dB/turn. For example, the bend loss can be from about 0.01 dB/turn to about 1 dB/turn, about 0.01 dB/turn to about 0.5 dB/turn, about 0.01 dB/turn to about 0.25 dB/turn, about 0.01 dB/turn to about 0.2 dB/turn, about 0.01 dB/turn to about 0.1 dB/turn, about 0.01 dB/turn to about 0.005 dB/turn, about 0.05 dB/turn to about 1 dB/turn, about 0.05 dB/turn to about 0.5 dB/turn, about 0.05 dB/turn to about 0.25 dB/turn, or about 0.05 dB/turn to about 0.2 dB/turn, about 0.2 dB/turn to about 1 dB/turn, about 0.2 dB/turn to about 0.5 dB/turn, or about 0.5 dB/turn to about 1 dB/turn, using a mandrel having a diameter of 30 mm. For example, the bend loss can be about 0.005 dB/turn, about 0.01 dB/turn, about 0.05 dB/turn, about 0.06 dB/turn, about 0.07 dB/turn, about 0.08 dB/turn, about 0.09 dB/turn, about 0.1 dB/turn, about 0.12 dB/turn, about 0.13 dB/turn, about 0.15 dB/turn, about 0.2 dB/turn, about 0.23 dB/turn, about 0.24 dB/turn, about 0.24 dB/turn, about 0.25 dB/turn, about 0.3 dB/turn, about 0.31 dB/turn, about 0.4 dB/turn, about 0.5 dB/turn, about 0.51 dB/turn, about 1 dB/turn, or any value between these values using a mandrel having a diameter of 30 mm.

The multicore optical fibers, according to the embodiments of the present disclosure, may have the same properties as discussed above with reference to the single-core optical fibers. For example, the glass cores of the multicore optical fibers may have the same trench volume, mode field diameter, effective area, and attenuation as disclosed above. Therefore, the optical fibers comprising the multicore optical fibers of the present disclosure may also have reduced profiles while still maintaining sufficient microbending and robustness needed for long-haul transmission.

Figure 11:
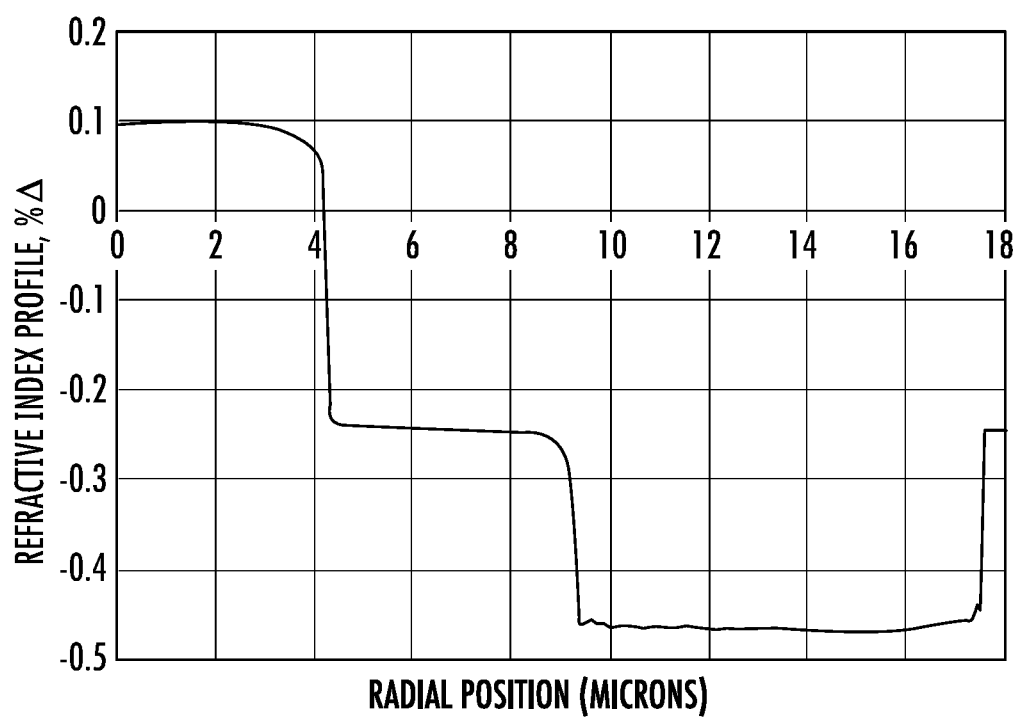
FIG. 11 depicts relative refractive index profiles of multicore optical fiber cores according to embodiments of the present disclosure.

Table 14 below provides examples of multicore optical fibers 310-340 in accordance with embodiments of the present disclosure. Each multicore fiber 310-340 is formed of 4 cores arranged in a square design, as shown in FIG. 9. Fibers 310-340 each have an outer glass diameter of 125 microns and a coating outer diameter of 242 microns. The radius ($r_1$) of each core of fibers 310-340 is about 17.5 microns, and each core is doped with chlorine. Furthermore, each core has an off-set trench design and a common cladding disposed outside of the trench (as disclosed herein). The refractive index of the common cladding is −0.245%. The distance D1 between a centerline of a first core and a centerline of a second core in fibers 310-340 is 40 microns. And, distance D3 between a centerline of the cores and an outer radius of the common cladding in fibers 310-340 is 34.2 microns. The optical properties of fibers 310-340 are shown in Table 14 below, and a relative refractive index profile of each core is shown in FIG. 11.

TABLE 14

Optical Properties of Multicore Optical Fibers 310-340

| Length of Fiber (m) | Multicore Optical Fiber 310 4582 | | | | Multicore Optical Fiber 320 2568 | | | |
|---|---|---|---|---|---|---|---|---|
| | Core 1 | Core 2 | Core 3 | Core 4 | Core 1 | Core 2 | Core 3 | Core 4 |
| Cable Cutoff (nm) | 1198 | 1199 | 1181 | 1188 | 1154 | 1156 | 1157 | 1165 |
| Mode Field Diameter at 1550 nm (μm) | 10.57 | 10.69 | 10.50 | 10.47 | 10.75 | 10.55 | 10.66 | 10.71 |
| Attenuation at 1550 nm loss (dB/km) | 0.173 | 0.167 | 0.191 | 0.199 | 0.182 | 0.185 | 0.192 | 0.184 |
| Polarization Mode Dispersion at 1550 nm (ps/√km) | 0.112 | 0.112 | 0.114 | 0.105 | 0.151 | 0.14 | 0.14 | 0.14 |

| Length of Fiber (m) | Multicore Optical Fiber 330 5429 | | | | Multicore Optical Fiber 340 22186 | | | |
|---|---|---|---|---|---|---|---|---|
| | Core 1 | Core 2 | Core 3 | Core 4 | Core 1 | Core 2 | Core 3 | Core 4 |
| Cable Cutoff (nm) | 1213 | 1203 | 1200 | 1208 | 1170 | 1170 | 1166 | 1173 |
| Mode Field Diameter at 1550 nm (μm) | 10.68 | 10.57 | 10.24 | 12.44 | 10.35 | 10.37 | 10.47 | 10.55 |
| Attenuation at 1550 nm loss (dB/km) | 0.194 | 0.165 | 0.229 | 0.162 | 0.203 | 0.189 | 0.189 | 0.188 |
| Polarization Mode Dispersion at 1550 nm (ps/√km) | 0.103 | 0.103 | 0.096 | 0.115 | 0.053 | 0.061 | 0.055 | 0.053 |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising:
  a core region comprising silica glass doped with chlorine and/or an alkali metal;
  a cladding region surrounding the core region, the cladding region comprising an inner cladding directly adjacent to the core region, an outer cladding surrounding the inner cladding, and a trench region disposed between the inner cladding and the outer cladding in a radial direction, the trench region having a volume of about 30% $\Delta$-micron$^2$ or greater;
  a primary coating surrounding the cladding region, the primary coating having an in situ modulus of about 0.5 MPa or less; and
  a secondary coating surrounding the primary coating, the secondary coating having an in situ modulus of about 1500 MPa or more,
  wherein a diameter of the secondary coating is about 210 microns or less.

2. The optical fiber of claim 1, wherein a thickness of the primary coating is about 25 microns or less.

3. The optical fiber of claim 2, wherein the thickness of the primary coating is in a range from about 8.0 microns to 20.0 microns.

4. The optical fiber of claim 1, wherein a thickness of the secondary coating is about 25 microns or less.

5. The optical fiber of claim 4, wherein the thickness of the secondary coating is in a range from about 8.0 microns to 20.0 microns.

6. The optical fiber of claim 1, wherein a ratio of a thickness of the secondary coating to a thickness of the primary coating is in a range from about 0.65 to 1.2.

7. The optical fiber of claim 6, wherein the ratio of the thickness of the secondary coating to the thickness of the primary coating is about 0.80.

8. The optical fiber of claim 1, wherein a diameter of the cladding region is about 130 microns or less.

9. The optical fiber of claim 8, wherein the diameter of the cladding region is about 110 microns or less.

10. The optical fiber of claim 1, wherein an in situ glass transition temperature Tg of the secondary coating is greater than about 70° C.

11. The optical fiber of claim 1, wherein the diameter of the secondary coating is about 200 microns or less.

12. The optical fiber of claim 11, wherein the diameter of the secondary coating is about 180 microns or less.

13. The optical fiber of claim 1, wherein a diameter of the cladding region is about 110 microns or less and the diameter of the secondary coating is about 200 microns or less.

14. The optical fiber of claim 13, wherein the diameter of the cladding region is about 90 microns or less and the diameter of the secondary coating is about 180 microns or less.

15. The optical fiber of claim 1, wherein the core region has a peak alkali metal concentration in a range from about 10 ppm to about 500 ppm.

16. The optical fiber of claim 1, wherein the alkali metal is at least one of sodium, potassium, and rubidium.

17. The optical fiber of claim 1, wherein the core region has a chlorine concentration in a range from about 0.4 wt % to about 2.2 wt %.

18. The optical fiber of claim 1, wherein the volume of the trench region is about 70% $\Delta$-micron$^2$ or less.

19. The optical fiber of claim 1, wherein a puncture resistance of the optical fiber is about 5 g or more.

20. The optical fiber of claim 19, wherein the puncture resistance of the optical fiber is about 15 g or more.

* * * * *